March 22, 1949.　　　C. F. LEATHERS ET AL　　　2,464,981
METHOD OF AND APPARATUS FOR ELECTRIC WELDING
Filed June 15, 1942　　　　　　　　　　　　　　6 Sheets-Sheet 1
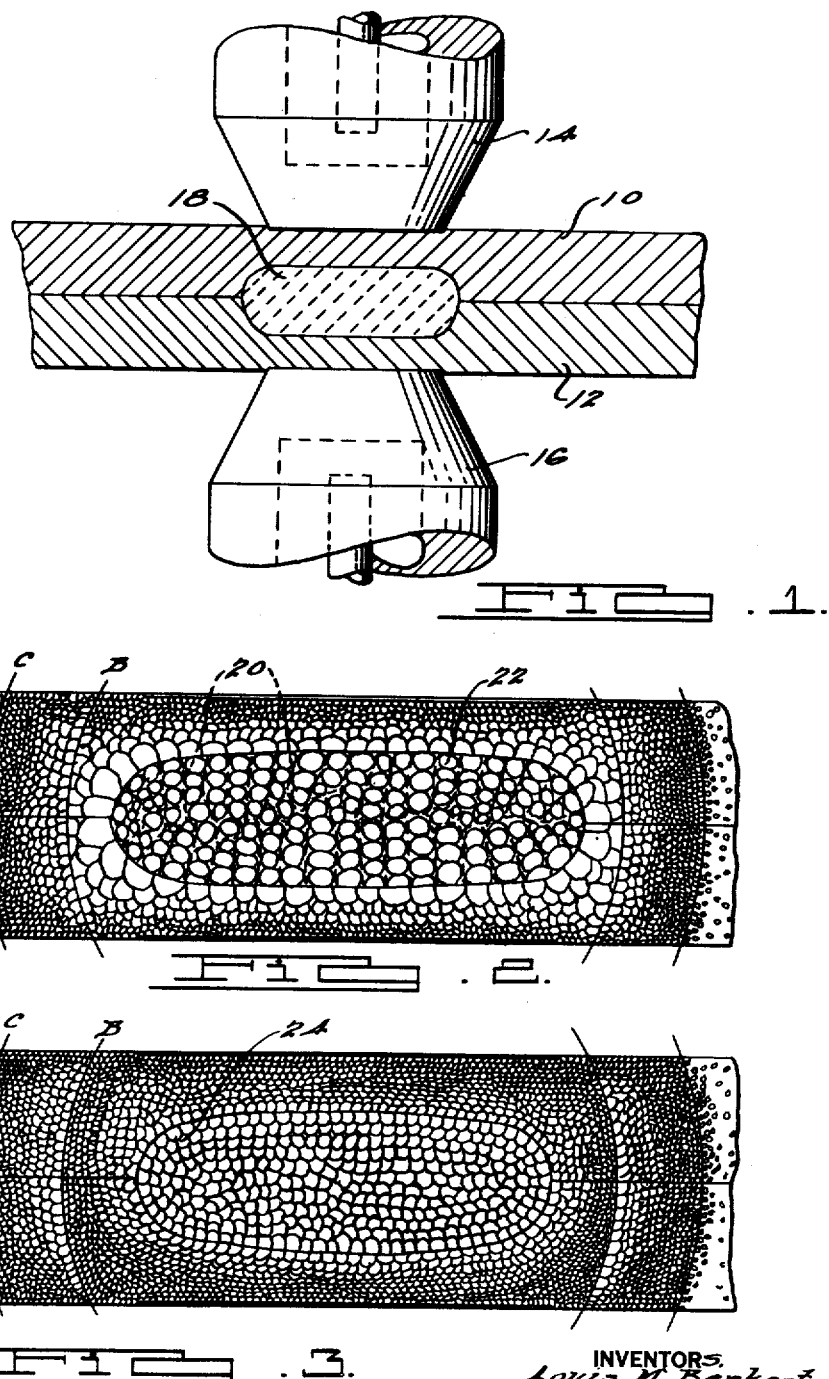

March 22, 1949.   C. F. LEATHERS ET AL   2,464,981
METHOD OF AND APPARATUS FOR ELECTRIC WELDING
Filed June 15, 1942   6 Sheets-Sheet 3
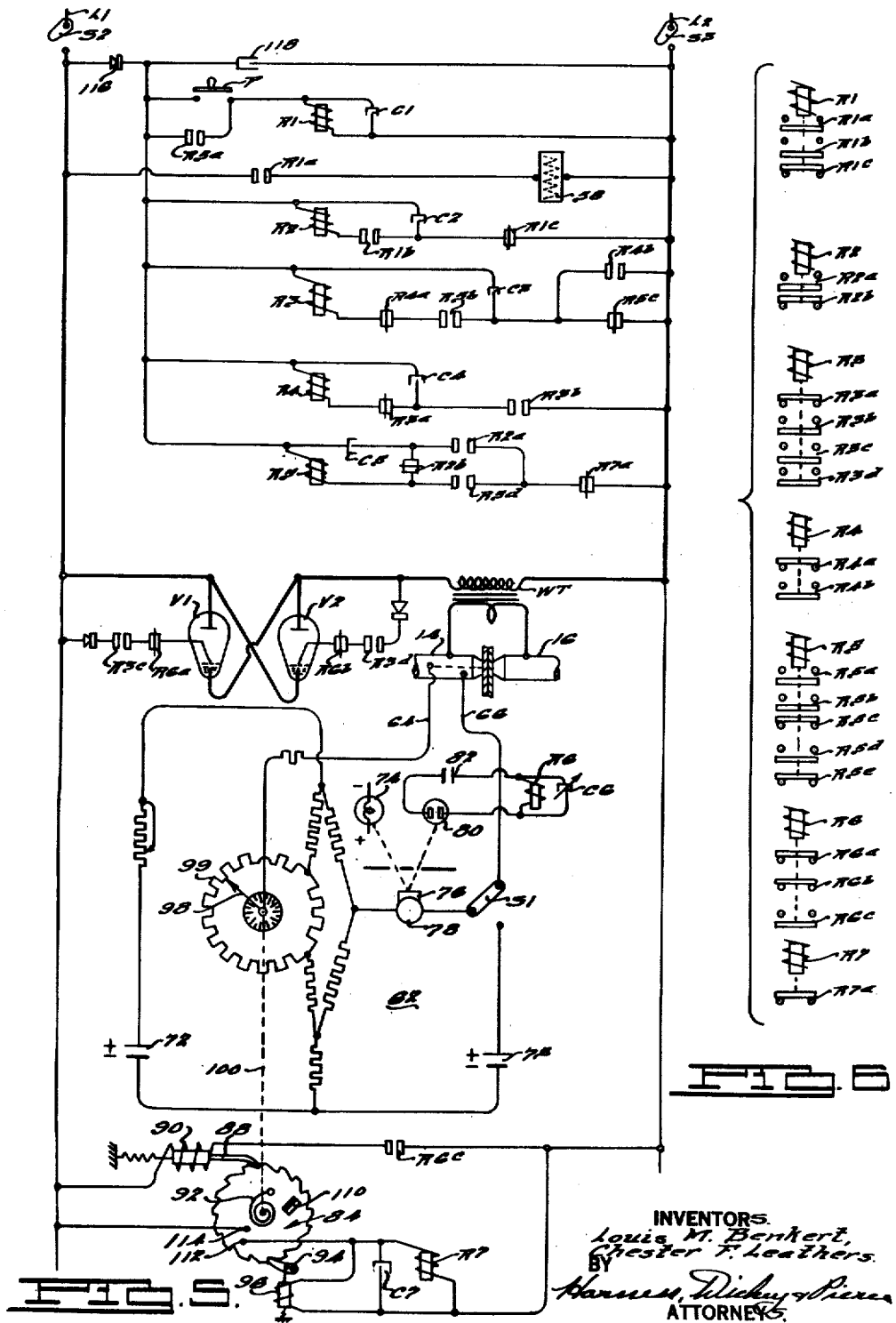

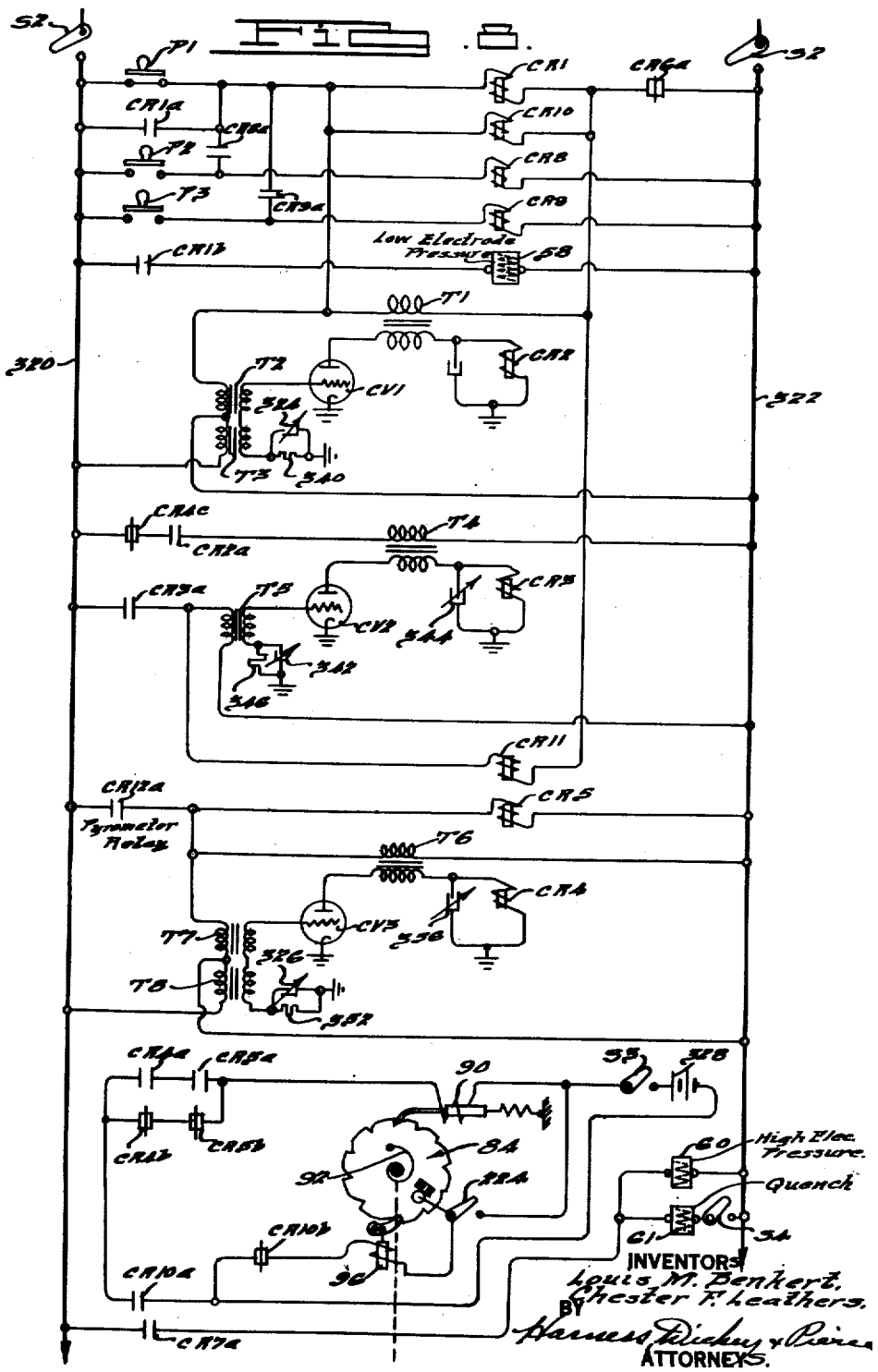

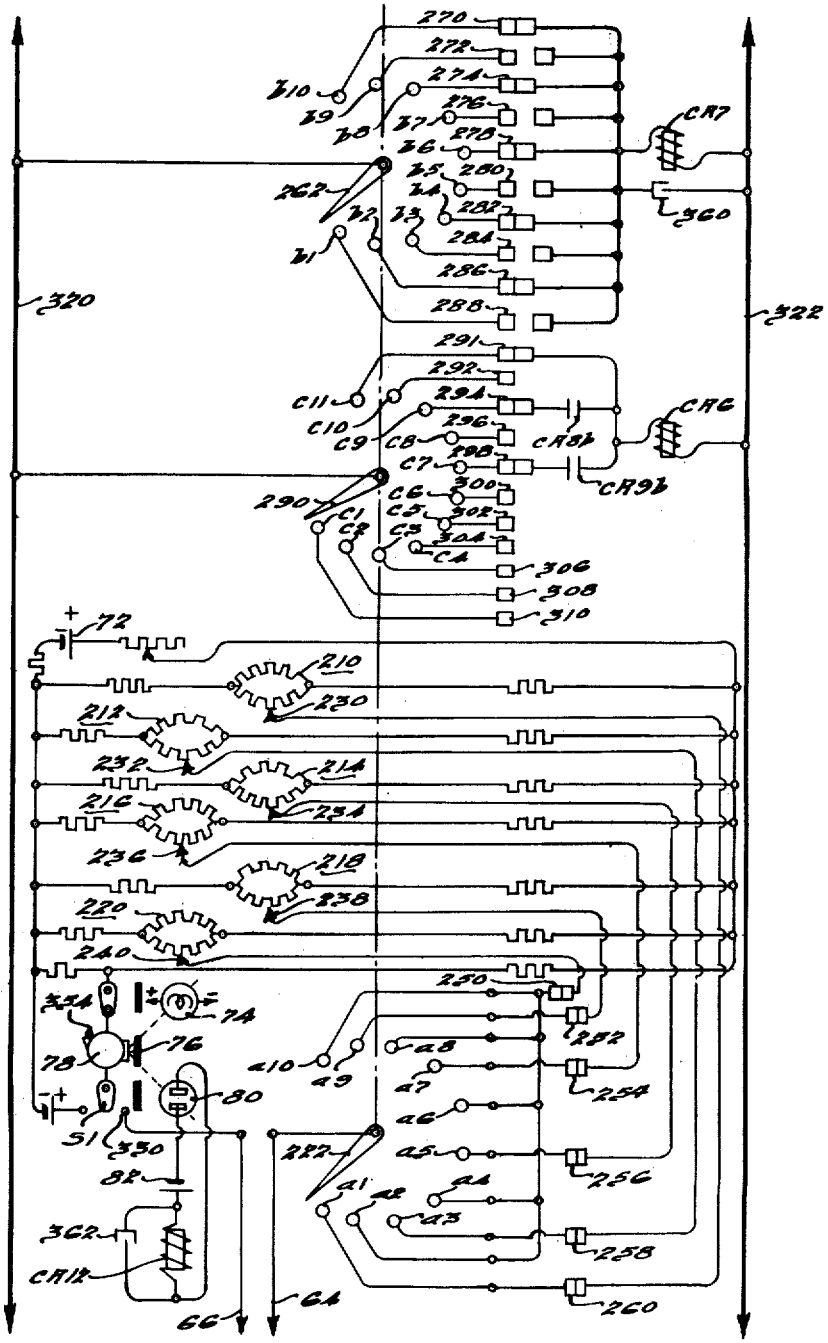

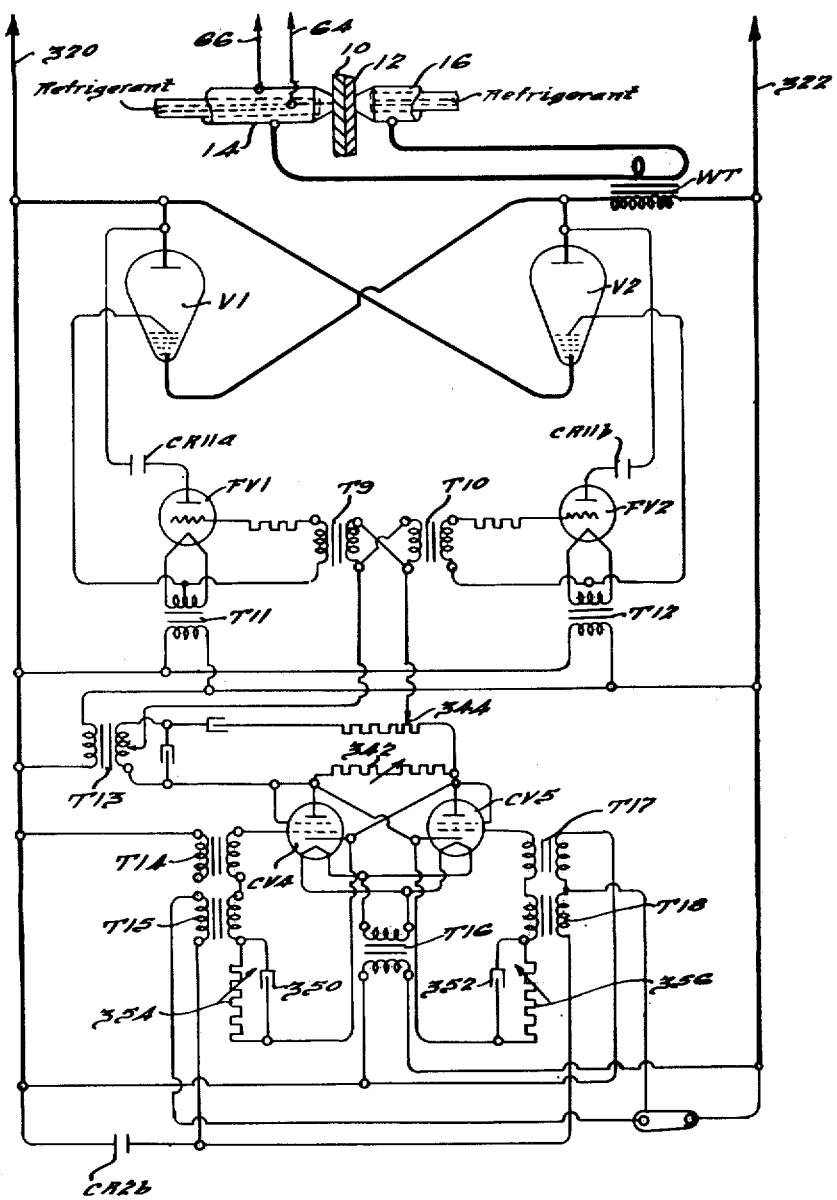

Patented Mar. 22, 1949

2,464,981

UNITED STATES PATENT OFFICE 2,464,981

METHOD OF AND APPARATUS FOR ELECTRIC WELDING

Chester F. Leathers and Louis M. Benkert, Detroit, Mich., assignors to Progressive Welder Company, Detroit, Mich., a corporation of Michigan Application June 15, 1942, Serial No. 447,006

11 Claims. (Cl. 219—4)

The present invention relates to improved processes and apparatus for producing welded products. The improvements of the present invention serve to provide improved electrically welded joints between workpieces, which, as to composition and gauge, have heretofore been considered adaptable to electric welding and further serve to enable the making of satisfactory electrically welded joints between workpieces which, because of their composition or gauge, or both, have not heretofore been considered as suited to electric welding operations. The present application is a continuation-in-part of the present applicants' copending application Serial No. 422,036, filed December 8, 1941, abandoned March 12, 1947.

The principal objects of the present invention are to provide a welded product comprising two or more pieces, united by a weld nugget which exhibits improved characteristics, and the parent metal immediately adjacent which also exhibits improved characteristics; to provide such a product wherein the weld nugget and the surrounding parent metal exhibits a grain structure approximately the same as that of the original parent metal; to provide such a product wherein the weld nugget and the immediately adjacent parent metal exhibits a grain structure which is a refinement of the cast structure of the nugget as originally formed and which is derived from a relatively fine austenitic grain structure; and to provide such a product wherein the weld nugget further exhibits a ductility consistent with at least one softening or drawing heat.

Further objects of the present invention are to provide improved processes for producing welded products of the above generally indicated type, as well as other products, which processes may be rapidly and economically practiced and which insure the provision of effective welds; to provide such processes wherein two or more members are united by passing a welding current therethrough whereby they are brought to a welding temperature, wherein the members are allowed to cool, and are thereafter subjected to at least one succeeding flow of heating current; to provide such processes wherein members are allowed to cool, between succeeding flows of current, to temperatures below the critical temperature, and wherein at least one said succeeding flow or flows of current is or are so controlled as to bring the members to a temperature below the welding point, but above the critical temperature; to provide such processes wherein at least one succeeding flow of current is so controlled as to bring the members to a temperature well into the austenitic temperature zone and at least one succeeding flow of current is so controlled as to limit the temperature rise to a value below or in the immediate region of the critical temperature.

Further objects of the present invention are to provide improved control systems for practicing the aforesaid processes and for producing products of the above type, as well as other products; to provide such systems wherein the flows of current through the members are controlled in accordance with the temperature of said members in the region of the weld; to provide such systems embodying temperature responsive elements and cooperating means, whereby the members are subjected to a succession of flows of current which bring the members to a progressively decreasing series of temperatures, beginning with a welding temperature and terminating with a temperature below the critical temperature of at least one of the members.

With the above as well as other objects in view, which appear in the following description and in the appended claims, preferred but illustrative embodiments of the invention are shown in the accompanying drawings, throughout the several views of which corresponding reference characters are used to designate corresponding parts and in which:

Figure 1 is a diagrammatic view in vertical section showing a pair of spot welding electrodes applied to workpieces;

Fig. 2 is an enlarged diagrammatic view illustrating the character of the grain structure in a weld nugget and in the surrounding parent metal following the passage through the work of a welding current;

Fig. 3 is a diagrammatic view in section, corresponding generally to Fig. 2, but illustrating the improvement in grain structure which results from certain of the steps of the present process;

Fig. 5 is a diagrammatic view of a control system which is operative to produce the cycle of Fig. 4;

Fig. 6 is a view showing the physical relation between certain of the relay windings and contacts which are operated thereby, which windings and contacts are shown separated from each other in Fig. 5;

Figs. 8, 8A, 8B, collectively constitute a diagrammatic view of a control system operative to produce the cycle of Fig. 7 as well as other cycles.

Figure 4:
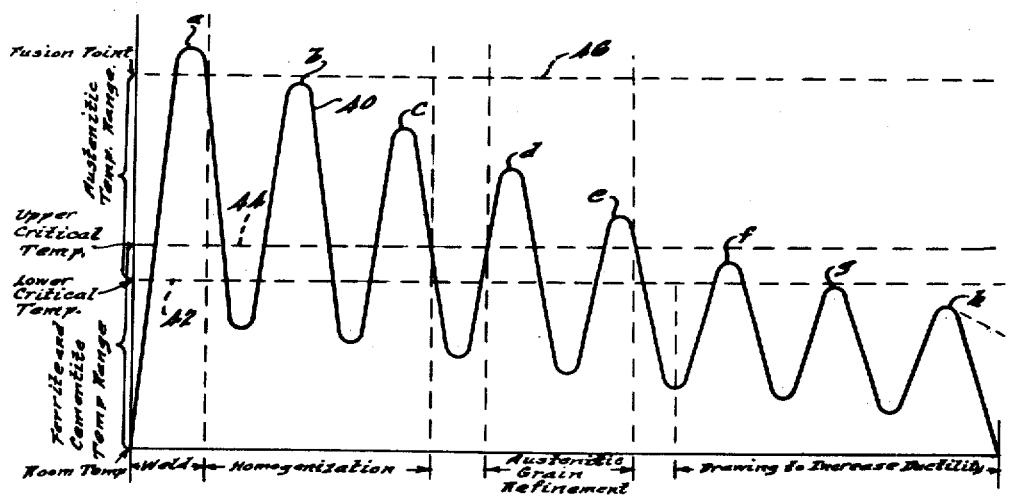
Fig. 4 is a diagrammatic view illustrating one complete welding cycle embodying the invention.

It will be appreciated from a complete understanding of the present invention that the improvements thereof are, in a generic sense, applicable to a wide variety of types of electric welding processes. It is now preferred to utilize these improvements in connection with the resistance welding, more particularly resistance spot welding, of various materials and, in an illustrative but not in a limiting sense, the invention is so disclosed herein. Also, the problems which are solved by the improvements of the present invention are in part at least encountered in the welding of many different metals and alloys of metals. The discussion herein, accordingly, of certain specific metals and alloys thereof is not to be taken in a limiting sense, and the term metals as used herein is generic to both metals and alloys of metals.

It is well recognized that the joints produced by conventional resistance welding operations, on workpieces of various compositions and various gauges, while admirably suited to a wide variety of different types of service, nevertheless, in general, are weaker than the parent metal sufficiently remote from the weld so that such parent metal is not affected by the heating at the weld. Analysis shows that this weakness is traceable to the fact that the welding operation produces a grain structure in the weld nugget and in the immediately surrounding parent metal which is less desirable than the original grain structure. This difficulty is encountered with various different materials and with various different gauges of a particular material, ranging, for example, from the very low carbon steels to relatively high carbon steels and to the so-called air hardening steels, as well as other metals and alloys. With the relatively softer metals, the difficulty is exhibited principally as a lack of toughness, and as the hardenability of the workpieces is increased, the difficulty is exhibited as a progressively increasing brittleness and by the presence of distinct lines of demarcation or weakness at the boundary of the nugget and in the region of the junction between the workpieces. Also, the parent metal surrounding the weld nugget is weakened by the weld heat. The present applicants have succeeded in largely, if not entirely overcoming the above, as well as other difficulties, by subjecting the welded joint to a course of heat treatment, following the initial flow or flows of welding current, during which course the grain of the nugget and of the surrounding parent metal is restored to a condition approximately the same as that of the original parent metal. More particularly, the present applicants have evolved a method which comprises the steps, following one or more welding steps, of subjecting the joint to one or more heats during the course of which the nugget is brought to a temperature or temperatures within the austenitic temperature range. These heats serve to homogenize the grain structure of the nugget and to produce a grain in the nugget and in the surrounding parent metal which is derived from relatively fine austenitic grains. In certain cases, such as those in which the hardenability of the workpieces is sufficiently high and/or those cases in which the welded joint may be subjected to shock loads, the present method further comprises the steps of completing the weld by subjecting the welded joint to one or more heats which increase the ductility of the nugget and of the surrounding parent metal. Applicants do not wish to be bound by any particular theory as to the exact nature of the grain structure changes which produce weakness in welded joints or by any particular theory as to why the herein described method succeeds in overcoming these difficulties. The theory discussed below, however, appears to afford a sound explanation and is advanced herein in an illustrative sense.

Figure 1 will be recognized as diagrammatically showing a conventional spot welding arrangement wherein a pair of workpieces 10 and 12 are clamped between the opposed faces of a pair of spot welding electrodes 14 and 16. It will be understood that a flow of current through the work and the electrodes raises the temperature of the work in the region of the joint between the members 10 and 12 to what may be called the fusion point and forms the weld nugget 18. Conventional spot welding cycles include the steps of clamping the work between the electrodes, passing the welding current through the work, and releasing the electrodes after the current has been interrupted and the nugget 18 has solidified and cooled. Various pressure cycles have been employed, such, for example, as a high initial pressure, a low welding pressure, and a final high pressure, and arrangements have also been proposed whereby the pressure is pulsating in character as distinguished from continuous. Similarly, both alternating and direct current sources have been utilized and have been arranged to progressively vary the welding current between maximum and minimum values, as well as to supply the current continuously or in a series of pulsations.

Independently of the character of the pressure and current cycles, however, all such welding operations involve bringing the metal which forms the nugget 18 to the fusion point and thereafter cooling such metal through the austenitic temperature range, and past the critical temperature of the work to room temperature. Depending, also, upon the rate at which heat is supplied to the metal which forms the nugget 18 in bringing it to the fusion point, more or less of the parent metal which surrounds the nugget is brought to a temperature between the critical temperature of the work and the fusion point thereof. For example, in Fig. 2, it will be understood that in bringing the metal of the nugget 18 to the fusion point, the region identified by the line C is brought to the critical temperature and the region identified by the line B is brought to a temperature between the fusion point and the critical temperature. The distances from the center of the nugget to the lines B and C depend upon the rate at which heat is supplied to the metal of the nugget, which rate, of course, determines the amount of which heat is enabled to flow from the nugget into the surrounding metal. In welding relatively light gauge workpieces, wherein the current flow may be limited to several cycles of a conventional alternating current source, or less, the lines B and C may be expected to fall relatively close to the bounding surface of the nugget. In welding relatively heavy gauge pieces, such as ½" thicknesses of certain of the so-called air hardening alloy steels, on the other hand, it is frequently found that the line C may fall approximately from 1" to 1½" from the center of a weld nugget of the order of 1" in diameter and that the line B is correspondingly located.

At the conclusion of the flow of welding current, the temperature of the nugget and of the surrounding parent metal, of course, decreases relatively rapidly. This cooling rate is in excess of a normal air cooling because of the flow of heat from the region of the nugget into the body of the work, which is remote from the nugget, and because of the extraction of heat from the region of the nugget by the electrodes. In accordance with conventional practice, such electrodes are supplied with water cooling, and in accordance with the invention disclosed and claimed in the copending application of Chester F. Leathers and Walter G. Moehlenpah Serial No. 446,176, filed June 8, 1942, now abandoned, as a continuation-in-part of their application Serial No. 415,184, filed October 16, 1941, abandoned June 9, 1942, the electrodes may be refrigerated. In addition, as described below, the cooling may be further accelerated by supplying the work in the region of the nugget with a direct water quench.

During the above cooling, several grain growths occur which cause certain of the difficulties which are solved by the improvements of the present invention. For example, as the nugget starts to cool, dendritic or columnar grains start to grow from the bounding surfaces of the nugget toward the center of the nuggets, which columnar grains are indicated by the dotted lines 20 in Fig. 2. The inner ends of the dendritic grains 20 abut each other along a more or less irregular plane in the region of the center of the nugget, which plane constitutes a definite plane of weakness of the nugget. Also, the adjacent sides of successive dendrites constitute additional planes of slippage and, consequently, of weakness. In general, the dendrites appear to break down into coarse but separate austenitic grains 22 during the course of the cooling operation, which breaking down however, only partially eliminates the brittleness of the dendritic structure. A conventionally formed nugget is thus a typical cast steel structure.

It will be appreciated that as the hardenability of the work is increased, the resultant weld nuggets and the immediately surrounding parent metal become progressively harder and, in view of the aforesaid austenitic grain growth and dendritic grain growth, the nuggets and the surrounding material consequently become decidedly brittle. It has heretofore been proposed to increase the ductility of weld nuggets and of the surrounding parent metal by subjecting the joint to post-heat treatment during the course of which the nugget is brought to a temperature below the critical temperature thereof. Disclosures of this sort are contained, for example, in Murray et al. Patent No. 1,252,144, as well as in the Tuttle Patent No. 2,262,705. It has been the experience of the present applicants that while such procedures do increase ductility, they do not serve to overcome weaknesses traceable to the dendritic structure and to the coarse austenitic grains. It has also been proposed, for example, in the Mikhalapov Patent No. 2,262,693, to inhibit dendritic grain growth by increasing the rate of cooling to such an extent as to prevent any substantial amount of dendritic grain growth. The Mikhalapov process involves an extremely short, high current welding cycle, which places a prohibitory demand upon the power source except in connection with materials of relatively light gauge. It has been the experience of the present applicants, further, that the inhibition of dendritic grain growth does not afford a satisfactory solution to the aforesaid difficulties. By way of comparison to the Mikhalapov process, therefore, the present method may be characterized as one wherein subsequent heating steps are taken to eliminate the effect of the dendrites and to eliminate the coarse austenitic grains. This feature of applicants' process enables the use of longer current cycles with a consequent reduction in current demand and further enables the use of resistance welding in connection with hardenable metals of thicknesses which have heretofore been considered as impossible to satisfactorily weld. The effects of applicants' intermediate heat treating steps are depicted in Fig. 3, in which by comparison with Fig. 2, it will be observed that the weld nugget and the immediately surrounding parent metal exhibit a grain structure derived from relatively small austenitic grains 24, as distinguished from the relatively larger austenitic grains 22. Also, the grains in the nugget are well interlocked with grains in the surrounding metal and there is no sharp line of demarcation at the boundary of the nugget. In other words, the original cast structure of Fig. 1 has been broken down or refined so that the coarse, more or less aligned austenitic grains are replaced by smaller, generally uniform, randomly arranged and, consequently, well interlocked austenitic grains.

The size of the austenitic grains is illustrated as progressively decreasing from the nugget toward the lines B and C, the grains immediately to the right of the lines B and C being approximately the same size as the grains to the left of the line C, which region in the course of the welding operation may be regarded as not having been raised to a temperature in excess of the critical temperature. It will be understood that by using a sufficient number of the post-heat treatments, of progressively decreasing maximum temperature values, the entire region from the line C to and including the nugget may be refined so that the grains therein are derived from austenitic grains of approximately the same size as those in the unaffected parent metal to the left of the line C.

Figure 7:
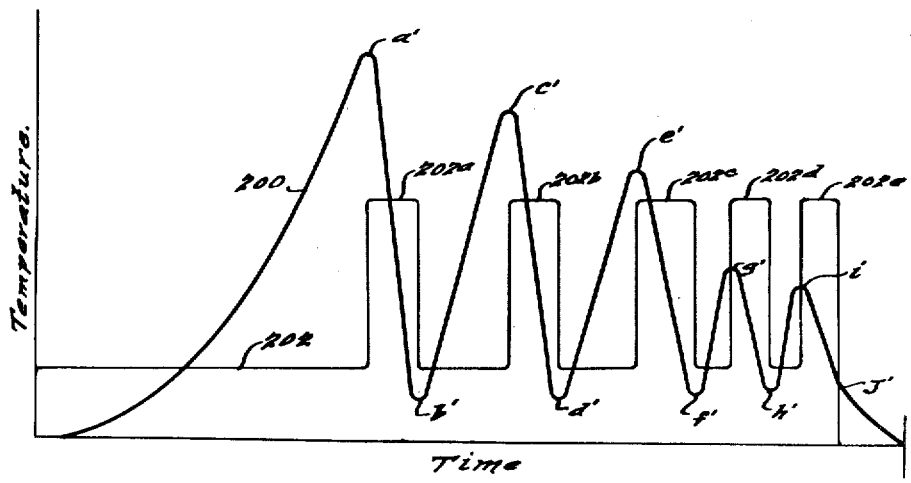
Fig. 7 is a diagrammatic view of a modified welding cycle embodying the invention.

Two illustrative complete welding cycles are shown in Figs. 4 and 7, and control systems suited to produce such cycles are shown, respectively, in Fig. 5 and in Figs. 8, 8A, and 8B. Referring particularly to Fig. 4, the curve 40 is derived by plotting the temperature of the workpieces against time. The horizontal line 42 will be recognized as corresponding to the so-called lower critical temperature of the workpieces, whereas the line 44 corresponds to the so-called upper critical temperature of the workpieces. It will be understood that the just-mentioned lower and upper critical temperatures differ to a greater extent for low carbon steels than for higher carbon steels, and are of substantially the same value for steels containing of the order of 1% carbon. In Fig. 4, it is assumed that the workpieces are air hardening alloy steels, having a carbon content ranging, for example, between 0.15% carbon and 0.5% carbon, and consequently the upper and lower critical temperatures for these steels differ somewhat in value.

The line 46 represents the fusion or welding point of the workpieces and again is taken as illustrative in value, in comparison with the values of the upper and lower critical temperatures. The exact proportionality between these several temperatures is, of course, determined by the specific composition of the workpieces.

Along the time axis, the curve 40 passes through four stages, first a welding stage, second a homogenization stage, third a grain refinement stage, and fourth a drawing stage. The time durations of these several stages are, of course, determined by a variety of considerations, such as the specific compositions of the work, the thickness of the individual plates, the electrode pressures, and the rates of heating and of cooling. In the present instance, also, in which the successive heats are controlled in accordance with the temperatures in the region of the welds, the lengths of the successive stages may vary somewhat in making successive welds.

In performing the process of Fig. 4, the workpieces 10 and 12 (Fig. 1) are clamped between the electrodes 14 and 16, with a predetermined pressure, after which the flow of welding current is initiated. If desired, the welding current may be initiated at a relatively low rate, so as to effect a preheating which frees the contacting surfaces of scale and the like, and evenly seats the electrode faces against the work, which rate may be progressively increased and may be caused to flow either continuously or as a succession of impulses. In the system shown in Fig. 5, the initial heat is effected by passing through the work a succession of impulses of uniform length, uniformly spaced apart, each of the impulses being of substantially the same intensity. This flow of welding current causes the temperature of the work to rise along the curve 40 to a peak value $a$, which is above the fusion or welding point of the metal, thereby forming a fused area of approximately the size of the nugget 18 of Fig. 1. When the temperature of the work reaches the just-mentioned point, the hereinafter described thermally responsive elements interrupt the flow of current and maintain the interruption for a period long enough to allow the temperature of the work to fall to a point below the lower critical temperature thereof, the rate of fall of the work temperature being determined by considerations such as are mentioned above. At the conclusion of the just-mentioned cooling interval, the flow of current is again initiated, as a succession of impulses, and causes the temperature to rise to the peak value $b$, which is lower than the melting point of the work, but is in the upper portion of the austenitic temperature range. When the just-mentioned peak $b$ is reached, the thermally responsive elements again interrupt the flow of welding current and allow the work to cool to a value which is again below the lower critical temperature. The control system thereupon again initiates the flow of current, as a succession of impulses, and causes the work to reach a peak temperature $c$, which is at an intermediate point in the austenitic temperature range. Following this action, similar cooling and heating cycles are initiated, which heating cycles successively bring the work to peak temperatures $d$, $e$, $f$, $g$, and $h$, which peak temperatures are progressively lower in value, peaks $d$ and $e$ being illustrated as being in the lower portions of the austenitic temperature range, peak $f$ being illustrated as being between the upper and lower critical temperatures, and peaks $g$ and $h$ being illustrated as being below the lower critical temperature or in the ferrite and cementite temperature range.

As will be appreciated; the initial or weld stage initially forms the weld nugget, such as 18, and brings to a fused state the body of metal represented by such nugget. During the immediately following cooling stage, the metal of the nugget passes relatively rapidly through the austenitic temperature range into the ferrite and cementite temperature range, and if the welding process is interrupted at this stage, it is usually found, as aforesaid, that the weld area exhibits the objectionable features discussed in connection with Fig. 2.

It will further be understood that the succeeding temperature peaks $b$ and $c$ are high in the austenitic range and enable some dispersion or diffusion of any impurities, originally present on the work surfaces, or segregated in the nugget during solidification. Also, these two temperature peaks or heats destroy the dendritic structure. Consequently, if the welding process is interrupted following the heats represented by the temperature peaks $b$ and $c$, the resultant nugget exhibits a relatively homogeneous grain structure, the surface grains whereof are well interlocked with grains which project into the nugget from the surrounding metal surface. The line of demarcation between the nugget and the surrounding parent metal is accordingly relatively indistinct, but the grains in the nugget are derived from austenitic grains of relatively large size.

The succeeding heats represented by the temperature peaks $d$ and $e$, both of which are shown as being in the lower portions of the austenitic temperature range, serve the purpose of refining the grain structure by materially reducing the size of the austenitic grains, it being understood that the size of the austenitic grains increases progressively in accordance with the degree to which the temperature of the metal is raised above the upper critical temperature. Heats in this range are also effective to destroy dendritic structure and enable some dispersion of impurities, as aforesaid, and may, to an extent sufficient for some welding applications, be relied upon to perform the functions attributed to the heats $b$ and $c$. If the welding process is interrupted, following the heat represented by the peak $e$, accordingly, the resultant nugget exhibits the last-mentioned characteristics so far as homogeneity and interlocking are concerned, and also exhibits a considerably finer and more satisfactory grain structure.

In the illustrated instance, the heat represented by the temperature peak $f$ falls between the upper and lower critical temperatures, and it may be expected, accordingly, that this heat results in some further austenitic grain refinement. Drawing or tempering is accomplished below the critical temperature, and while heat $f$ would not have a tempering effect, it would have a softening effect. Also, with certain of the alloy steels, the alloying elements such as chromium, vanadium, molybdenum, tungsten, etc., are carbide forming elements and the resultant carbides dissolve only when heated somewhat above the upper critical temperature. Consequently, a softening or decrease in hardness may be accomplished with such alloy steels by post-heating to a point such as $f$ or even $e$, above the lower critical temperature but below the temperature at which these carbides dissolve. In the present application, accordingly, the term "softening step" is used to generically refer to both softening and drawing operations. The heats $g$ and $h$, both of which are below the lower critical temperature, function as drawing heats and increase the ductility of the nugget.

As mentioned in connection with Figs. 2 and 3, as the nugget is brought to the successive temperature peaks represented by the peaks $a$ through $h$, the regions external to the nugget, such as are represented by the lines B and C, are brought to temperatures lower than the nugget temperatures. For example, in bringing the nugget to the fusion temperature, the area represented by the line B may be brought to a temperature in the upper part of the austenitic range and the area just to the right of the line C may be brought to a temperature just above the critical. Following such heating step, accordingly, the area adjacent the line B exhibits traces of large austenitic grains. A subsequent heat, however, which brings the nugget to a temperature represented by the peak b, may be expected to bring the region represented by the line B to a point in the lower part of the austenitic range, and followi g such heat the area adjacent the line B exhibits grains derived from relatively fine austenitic grains. It will be understood, therefore, that the number of heats may be so selected, in relation to the temperature attained during each heat, that the entire area, including the nugget and extending from it to the line C, is given a homogeneous grain structure derived from relatively fine austenitic grains. At the conclusion of the full welding cycle, therefore, the entire weld area is restored to a grain structure of the same type and of approximately the same quality as the original grain structure. In many cases, it is important to reduce the number of heats, but it is preferred to insure that all portions of the weld area which, at any stage of the welding operation, are brought to a temperature high enough to produce coarse austenitic grains, are thereafter brought to a lower temperature in the austenitic range, so as to refine such austenitic grains. With certain steels, as aforesaid, it is preferred to soften the weld area, by use of one or more heats in the appropriate temperature range.

In a generic sense, any of a variety of different control systems may be utilized to practice the herein described welding processes. The control system shown diagrammatically in Fig. 2 is, however, well suited to the invention, and embodies features described and claimed in Letters Patent No. 2,372,211, granted March 27, 1945. Referring to Fig. 5, the illustrative control system comprises a usual welding transformer WT, the primary winding whereof is connected to a suitable alternating current source of supply, represented by the line conductors L1—L2, by means of a pair of reversely connected rectifiers V1 and V2. Rectifiers V1 and V2 may be of any suitable type, but are illustrated as being of the type sold commerically under the trade name "Ignitron" and will be recognized as comprising an outer envelope containing a gaseous atmosphere such as mercury, an anode, a reconstructing type of cathode, and an igniter electrode. It will be appreciated that rectifiers V1 and V2 are normally non-conducting, but that, upon the application of a critical potential between the control electrode and the cathode thereof, during a half cycle in which the anode is positive with respect to the cathode, each such rectifier becomes conducting, and remains so for the balance of the corresponding half cycle of current flow. The secondary winding of the welding transformer is conventionally connected to the welding electrodes 14 and 16. It will be understood that either or both of the electrodes 14 and 16 may be movably mounted, so as to enable them to be separated, whereby the work 10—12 may be introduced therebetween. Any suitable means (not shown) may be provided to control the movement of the electrodes 14 and 16 between the retracted and work engaging positions, and in the present system, such control means are illustrated as comprising a pressure control valve 58 which may be of the usual electromagnetically operated type.

The initiation of each welding cycle is controlled by a usual pilot switch P, closure of which introduces a series of operations under the control of a series of electro-magnetically operated relays R1, R2, R3, R4 and R5. These relays function, as hereinafter described, to cause the delivery to the welding transformer, during each heat, of a succession of current impulses.

The means for interrupting the flow of welding current to the welding transformer when the work initially reaches the welding temperature, and for thereafter terminating succeeding flows of welding current when the work reaches corresponding and progressively lower temperatures, is preferred thermally responsive so as to afford a measure of the temperature of the nugget. Generally, the measure may be obtained by various types of thermally operative apparatus, and may be taken at various points in or near the nugget. The illustrated apparatus is described in detail in said Patent No. 2,372,211, and comprises a pyrometer circuit 62 of the Wheatstone bridge type, the input leads 64 and 66 whereof are connected to thermocouple elements 68 and 70, which in turn are disposed to respond to a temperature in the region of the weld nugget, and thus produce a measure of the temperature of the nugget. Further description of this thermocouple arrangement is given in connection with Figs. 8, 8A and 8B. When the thermoelectric potential developed between the elements 68 and 70 attains a predetermined ratio to the potential of the battery 32, as will be understood, the galvanometer element 78 reaches a position in which a mirror 76, carried thereby, reflects light from the continuously energized source 74 onto a photoelectric cell 80. The cell 80 is provided with a source of current, indicated as a battery 82, and although the output of the cell may be amplified, it is herein illustrated, for simplicity, as being applied directly to a control relay R6. Upon being operated, as hereinafter described, relay R6 terminates the flow of welding current, allowing the work to cool, and also operates an indexing mechanism 84, which functions to adjust the setting of the pyrometer 62 to a lower temperature value. The indexing mechanism 84 also functions, as hereinafter described, at the completion of the full welding cycle, to reset the pyrometer 62 to an initial position, and to also reset the control system, in readiness for the initiation of a new welding cycle under the influence of the pilot switch P. The indexing mechanism 84 comprises a rotatable drum, provided with ratchet teeth, such as 86, which cooperate with a ratcheting armature 88. The armature 88 is provided with an operating coil 90. The drum is continuously urged in a counterclockwise or resetting direction by means of a spring 92, but is temporarily restrained, until reset, in each rotative position by means of a release pawl 94, which is under the control of a winding 96. The drum is mechanically coupled to the control arm 98 by means of a shaft 100 and it is to be noted that the control arm 98 may be rotated relative to the shaft 100 in order to provide any desired initial setting of the pyrometer.

It is thought that the remaining details of the system may best be understood from a description of the operation thereof.

Assuming now that it is desired to make a weld, the system of Fig. 5 may be conditioned for operation by initially placing the pyrometer 62 in proper adjustment, which may be accomplished, as will be understood, by reversing the position of the manually operated switch S1, so as to couple the testing battery 73 into the circuit and thereafter balancing the system so that the galvanometer element 78 occupies a desired position under the influence of the algebraic sum of the potentials of batteries 71 and 73. Thereafter the indexing drum 84 may be rotated by releasing the armature 88 and pawl 84, so as to bring the drum to a rotative position such as will require a desired number of indexing movements in order to bring the drum from the starting position to a position in which the drum carried contact 110 bridges the stationary contacts 112 and 114 and energizes the winding 96, thereby resetting the pyrometer, as previously mentioned. Also, the pointer 98 may be rotatively adjusted relatve to the shaft 100, so as to give a desired heat setting corresponding to the initial or starting position of the drum 84. Finally, it will be understood that the potentiometer 99 may be provided with adjustable taps, so that each indexing movement of the pointer 98 provides a desired but adjustable amount of variation in the critical temperature at which the pyrometer actuates the relay R6.

In further preparation for the welding cycle in question, the usual line switches S2 and S3 may be closed, thereby connecting the control elements to the line conductors L1 and L2. This action immediately supplies a charge through the rectifier 116 to the filter condenser 118, and also supplies charging current through the now closed contacts R1c to the control condenser C2, associated with relay R2. A similar charging circuit is immediately completed through contacts R5c for condenser C3, associated with relay R3. Further, closure of the switches S2 and S3 applies potential to the main rectifiers V1 and V2, which rectifiers, however, remain non-conducting since the circuits associated with the control electrodes of these rectifiers are interrupted at the now open contacts R3b and R3c.

The system is now in readiness for operation, and assuming the desired workpieces are properly positioned between the electrodes 14 and 16, the pilot switch P may be momentarily closed to initiate the actual welding cycle.

Closure of switch P completes an obvious energizing circuit for the coil of relay R1, which thereupon moves to the energized position, closing its contacts R1a and R1b, and opening contacts R1c. Closure of contacts R1a completes an obvious energizing circuit for the previously mentioned valve 58, which thereupon applies a welding pressure to the electrodes and causes them to clampingly engage the work between them. The opening of contacts R1c interrupts the previously described charging circuit for condenser C2, and closure of contacts R1b completes a local circuit through which condenser C2 is enabled to supply current to and energize relay R2. Upon being energized, relay R2 closes contacts R2a and opens contacts R2b.

Closure of contacts R2a completes a charging circuit through now closed resetting relay contacts R1a for condenser C5, associated with relay R5, and at the moment, the opening of contacts R2b serves no purpose except to prevent immediate energization of relay R5.

At the expiration of a relatively short so-called squeeze-time, determined by the discharge characteristics of condenser C2, relay R2 times out and resumes the de-energized position, re-opening contacts R1b and re-closing contacts R2b. The just-mentioned squeeze time interval is preferably proportioned to be just sufficient to insure the attainment of the proper electrode pressure before the flow of welding current is initiated.

The re-opening of contacts R2a interrupts the previously mentioned charging circuit for condenser C5, and the reclosure of contacts R2b completes a discharge circuit for condenser C5, through which it is enabled to supply current to and energize relay R5. Upon being energized, relay R5 closes its contacts R5a, R5b and R5d and opens its contacts R5c. The closure of contacts R5a completes a holding circuit for relay R1, in parallel with the pilot switch P, which switch may consequently be released to the open position without affecting the cycle now in progress. The opening of contacts R5c interrupts the previously traced charging circuit for condenser C3, and the concurrent closure of contacts R5b completes a discharge circuit for condenser C3, which enables it to supply discharge current to and energize relay R3, which, as mentioned below, thereupon operates to initiate the flow of welding current. The closure of contacts R5d completes a self-holding circuit for relay R5, which is subject only to the now closed resetting relay contacts R1a, and it will be appreciated, therefore, that condenser C5, associated with relay R5, is required to have only a relatively short discharge period.

Upon being energized, as aforesaid, relay R3 opens its contacts R3a and closes its contacts R3b, R3c and R3d. Closure of contacts R3c and R3d completes obvious circuits for the control electrodes of the main rectifiers V1 and V2 and places these rectifiers in condition to conduct current to the welding transformer WT. It will be understood that the rectifier which is first fired in response to the completion of the just-mentioned firing circuits depends upon the polarity of the source L1—L2 at the instant of closure of contacts R3c and R3d.

Upon being energized, the welding transformer WT supplies current through the electrodes 14 and 16 to the work and initiates a progressive rise in the temperature thereof, as will be understood.

The opening of contacts R3a prevents completion of a circuit for the winding of relay R4 and the concurrent closure of contacts R3b completes a charging circuit for condenser C4, associated with relay R4. After a short period of current flow, determined by the characteristics of the discharge circuit associated with condenser C3, relay R3 times out and resumes the de-energized position, re-opening contacts R3b, R3c and R3d and re-closing contacts R3a. The re-opening of contacts R3c and R3d interrupts the firing circuits for the valves V1 and V2 and consequently causes further flow of current to the weld transformer WT to be interrupted. The actual interruption occurs at the conclusion of the half cycle of current flow in progress at the time such contacts re-open, as will be appreciated.

The re-opening of contacts R3b interrupts the previously traced charging circuit for condenser C4 and reclosure of contacts R3a completes a discharge circuit for this condenser through which it is enabled to energize relay R4. This action causes relay R4 to open its contacts R4a and close its contacts R4b. The opening of contacts R4a prevents the completion of a circuit for re-energizing relay R3 and closure of contacts R4b completes a circuit for recharging condenser C3. At the conclusion of a "cool" period determined by the discharge characteristics of condenser C4, relay R4 resumes the de-energized position, re-opening its contacts R4b and reclosing its contacts R4a. This transfer movement interrupts the just traced charging circuit for condenser C3 and completes a discharge circuit through which it is enabled to re-energize relay R3, which action produces the same results as are described above. So long, therefore, as relay R5 remains energized, relays R3 and R4 cooperate to provide successive "heating" and "cooling" periods, current being supplied to the welding transformer WT during each heat period and such current being interrupted during each cool period. It will be understood that these successive heat and cool periods are variable in length. Also, it will be appreciated that during the successive cool periods the work engaging tips of the electrodes have an opportunity to cool somewhat, thereby minimizing the tendency of these electrodes to become overheated and mushroom. The length of the cool periods is not sufficient to allow the temperature of the weld zone to materially decrease.

The heating action, which takes place as a consequence of the succession of impulses of current through the work, ultimately builds up a sufficient thermoelectric potential between the pyrometer leads 64 and 66 to cause the galvanometer element 78 to assume the position shown in the figure, in which it reflects light from the continuously energized source 74 onto the photoelectric cell 80. When this condition is reached, battery 82 is enabled to pass current through the cell 80 and supply energizing current to relay R6 and its associated condenser C6. Upon being so energized, relay R6 opens its contacts R6a and R6b and closes its contacts R6c. The opening of contacts R6a and R6b interrupts the previously mentioned firing circuits for rectifiers V1 and V2 and terminates the flow of welding current to the work in the manner previously described in connection with the opening of contacts R3c and R3d. It will be appreciated that the action of relay R6 may occur during either a heating or a cooling period and if such action occurs during a cooling period, relay R6 functions only to prevent recompletion of the welding circuit at the end of the corresponding cooling period. The closure of contacts R6c completes an obvious energizing circuit for the indexing winding 90, which thereupon actuates armature 88 to advance the drum 84. This movement of the drum turns the pointer 98 from the initial or weld stage setting thereof to the next succeeding setting, appropriate, for example, to produce the temperature peak b in Fig. 4. The interruption in flow of welding current enables the temperature of the weld zone to fall away rapidly as is indicated by the curve 40 in Fig. 4, and while this cooling action lowers the thermoelectric potential to a value well below the original and the adjusted setting of the pointer 98, relay R6 remains energized, under the influence of condenser C6, for a time sufficiently long to insure that the temperature of the work will fall a point below the lower critical temperature of the work. When condenser C6 times out, relay R6 resumes the de-energized position, reclosing contacts R6a and R6b, and re-opening contacts R6c. The latter action enables the armature 88 to resume its illustrated position, but does not affect the position of the drum, in view of the holding action of the reset pawl 94. The reclosure of contacts R6a and R6b renders the firing circuits for valves V1 and V2 again subject to the position of the impulsing relay contacts R3c and R3d. If this action occurs during a cool period, such reclosure of the contacts R6 has no effect until the end of such cool period, at which time rectifiers V1 and V2 again become conducting and re-initiate the flow of current to the welding transformer.

The re-initiation of the flow of welding current, in a succession of impulses, as before, causes the temperature of the welding zone to rise along the curve 40 and ultimately reach a value corresponding to the peak b, at which time the pyrometer 62 operates relay R6 to again interrupt the flow of welding current and to advance the pointer 98 to a position appropriate to the next succeeding temperature peak c. The interruption in flow of the welding current again enables the weld zone to cool to a temperature well below the lower critical temperature. At the end of this cooling period, relay R6 again resumes the de-energized position and initiates the flow of welding current for the third heat, represented by the peak c. It is believed to be evident that the system continues to function to provide the peaks c, d, e, f, g, and h, each separated by a cooling period, in the manner previously described. It is here noted that since the length of each cooling period is determined by condenser C6, the temperatures at which the work is allowed to fall immediately preceding the stages represented by the peak c, d, etc., are progressively lower than the temperature which immediately precedes the heat represented by the peak b. These lower temperatures, however, are not proportionately lower, in view of the fact that the temperature of the work falls off along a non-linear curve, as will be understood.

When the cycle has progressed to the final heat, and the temperature of the work has reached the value represented by the peak h, the notching movement of the drum 84 moves the contact 110, carried thereby, into bridging relation to the stationary contacts 112 and 114, and immediately completes a circuit for the return winding 96 and the resetting relay winding R7. A charging circuit is also completed for the associated condenser C7. The energization of winding 96 releases the pawl 94 from holding engagement to the drum and enables the spring 92, associated therewith, to restore it to the starting position, during the initial portion of which movement contact 110 moves away from contacts 112 and 114. Condenser C7, however, retains the release winding 96 energized long enough to enable the completion of the return movement of the drum. The energization of resetting relay R7 causes this relay to open its contacts R7a, which action interrupts the previously traced holding circuit for relay R5. As aforesaid, condenser C5 has timed out by the time contacts R7a open, and the opening of these contacts, therefore, causes relay R5 to immediately resume the de-energized position, re-opening contacts R5a, R5b, and R5d and reclosing contacts R5c.

The re-opening of contacts R5b opens the circuit for the impulsing relay R3. If this action occurs during a "heat" period, it immediately de-energizes relay R3 and interrupts the further flow of current to the welding transformer, as will be appreciated. If this action occurs during a "cool" period, it serves to prevent re-energization of relay R3 at the conclusion of such cool period.

The re-opening of contacts R5a interrupts the previously traced holding circuit for the coil of relay R1 and renders this relay subject to the hold-time condenser C1. At the expiration of a hold-time period, which is long enough to allow the weld to set and the length of which is determined by the discharge characteristics of condenser C1, relay R1 resumes the de-energized position, re-opening its contacts R1a and R1b, and reclosing contacts R1c. The re-opening of contacts R1a de-energizes the pressure valve 58, thereby relieving the electrode pressure upon the work and completing the actual welding cycle.

The remaining operations which result from the de-energization of relay R5 are resetting operations which condition the system for a succeeding welding cycle. More particularly, upon being de-energized, as aforesaid, relay R1 reopens its contacts R1b and recloses its contacts R1c, thereby interrupting the circuit for the winding of relay R2 and completing the initially completed charging circuit for condenser C2. The de-energization of relay R3 opens its contacts R3b and recloses its contacts R3a, which actions interrupt the charging circuit for condenser C4 and connect condenser C4 to the winding of relay R4. If a cool period is in progress at the time the resetting relay R7 is actuated, as aforesaid, relay R4 remains in the energized position until the expiration of such cool period and thereupon recloses its contacts R4a and reopens its contacts R4b, which actions interrupt one of the two charging circuits for condenser C3 and partially complete a circuit between condenser C3 and the winding or relay R3. In addition to the operations mentioned above, the de-energization of relay R5 also causes contacts R5c to reclose and recomplete the originally traced charging circuit for condenser C3. Also, contacts R5d re-open, interrupting the previously traced self-holding circuit for relay R5.

Further describing the resetting operations, it is noted that shortly after the final interruption of the flow of welding current, the pyrometer relay R6 resumes the deenergized position, enabling armature 88, associated with the indexing drum 84, to resume its normal position in readiness for the next cycle. It will be understood that condenser C6 holds the relay R6 in the energized position long enough to allow the aforesaid resetting operations to take place, even though the pyrometer is restored to a higher temperature setting. Reclosure of contacts R6a and R6b also prepares the firing circuits for the rectifiers V1 and V2 in readiness for such next welding cycle. Finally, at the conclusion of a short period determined by the condenser C7, relay R7 resumes the de-energized position and recloses contacts R7a. This action is without immediate effect, since contacts R2a and R5d are now open, and consequently prevent a re-energization of relay R5.

The illustrative cycle of Fig. 7, as produced by the control system of Figs. 8, 8A and 8B, differs from the cycle of Fig. 4 in several respects, namely, the temperature to which the work falls during the several cooling periods between successive heats is thermally controlled, second, a variable pressure cycle is employed, and third, the over-all number of heats is reduced. It has been found that the over-all length of the cycle can be reduced and a more positive control thereof be obtained by utilizing thermally responsive means to limit the degree to which the temperature falls during cooling periods and to initiate the succeeding heating cycle. In certain cases it is desirable to use different lower temperatures between the successive heats, but in Fig. 7 the lower temperature points are shown as being substantially uniform in value.

It will be recalled that in the cycle of Fig. 4, as provided by the system of Fig. 5, the electrode pressure remains constant throughout the welding operation. It is found that improved results are obtained with certain materials and certain gauges if a relatively lower pressure is used during each heating period and if a relatively higher or forging pressure is used during each cooling period. The relatively low pressure provides efficient heating conditions, and the higher pressure serves to forge the work-pieces together. Also, the relatively low heating pressure minimizes the indentation of the electrodes into the work during the heating periods and the relatively higher cooling pressure serves to eliminate any blow holes which are formed during the preceding heating period. The higher cooling pressures are particularly useful following each heat in which the work is brought above the critical temperature. In many cycles, however, the final stage may fall at or slightly above the critical temperature, as aforesaid, and consequently in Fig. 7 the high cooling pressure is illustrated in connection with all of the stages.

As previously mentioned, questions of economy may require, or the analysis or the gauge of the work may permit, the use of a considerably smaller number of heats than are shown in Fig. 4. The system of Figs. 8, 8A and 8B is readily adjustable to give from one to five heats, with automatic and adjustable control of both the upper and lower heating and cooling temperatures, and Fig. 7 thus includes five heating stages, to which no temperature values are assigned in the figure. In welding certain of the air hardening steels in accordance with the examples given hereafter, it has been found preferable to have the heat $a'$ serve as a welding heat, to set the seat $c'$ to serve primarily as a homogenizing heat, the heat $e'$ as a grain refining heat, and heats $g'$ and $i'$ as softening heats. On the other hand, utilizing the same gauges and types of workpieces, but in cases where it is particularly important to shorten the over-all length of the cycle, it has been found that commercially acceptable results are obtained by eliminating the heats $d'$ and $e'$, leaving a total of three heats, namely, a welding heat ($a'$), a grain refining heat in the lower part of the austenitic range ($b'$), and a final heat somewhat above the critical ($c'$). This three-stage cycle has been found to satisfactorily refine and soften all parts of the weld zone.

Referring now to Figs. 8, 8A and 8B, current is supplied to the welding transformer WT through a pair of reversely connected gaseous rectifiers V1 and V2, which may be and preferably are the same as the previously described rectifiers. The ignition of rectifiers V1 and V2 is controlled by the contacts CR11a and CR11b of a control relay CR11 and by a pair of firing valves FV1 and FV2. The grid circuits of these firing valves are controlled in such a way as to give the progressively increasing value of heating current during the initial heat, leading to the temperature peak $a'$ of Fig. 7. This progressive change is accomplished by varying the point, in succeeding half cycles, of the alternating current at which the firing valves FV1 and FV2 are rendered conductive. This variation in turn is controlled by phase control apparatus associated with the grid circuits of the valves FV1 and FV2 and comprising the control valves CV4 and CV5, which apparatus is described and claimed in the copending application Serial No. 402,922 of Undy, filed July 18, 1941, now Patent No. 2,401,780, dated June 11, 1946.

The cutting off and re-initiation of current flow at the successive peaks and valleys $a'$, $b'$, $c'$, etc., is controlled by a multiple pyrometer unit which is selectively and automatically reconnectible during the course of the welding cycle in such a way as to cut off the current at each of the temperature peaks and to re-initiate the flow of current at each of the intervening valleys. This pyrometer unit may be variously arranged, but it is preferred to use a unit manufactured by C. J. Tagliabue Manufacturing Company and sold under the name "Select Ray," which unit has the advantage that a single galvanometer element may be connected to any one of a plurality of potentiometer circuits and so is responsive to any of a plurality of different temperatures corresponding, respectively, to the several potentiometer circuits. As shown, the unit comprises a galvanometer 78 provided with a mirror 76, which, as before, serves to reflect light from a continuously energized source onto a photocell 80 at critical temperatures of the unit. In this instance, a plurality of potentiometer circuits 210, 212, 214, 216, 218 and 220 are provided, any one of which may be connected, through the movable arm 222 of the ratchet unit 84, to cooperate with the galvanometer 78. The ratchet unit 84 may, as before, be provided with an operating coil 90 and a reset coil 96. In this instance, also, the ratchet unit is provided with a limit switch 224, which is open when the unit is in its normal or starting position, but is closed in all other positions of the unit.

The potentiometer circuits 210 through 220 are provided, respectively, with adjustable taps 230 through 240, the setting of which, as will be understood, determines the temperature at which, when associated with a particular potentiometer circuit, the pyrometer unit is effective to operate the associated control relay CR12.

The arm 222 is arranged to cooperate with a series of stationary contacts $a1$ through $a10$, which are selectively cross-connectible and which may be connected by means of conventional plug and jack elements 250, 252, 254, 256, 258 and 260 to the previously mentioned taps 230 through 240, respectively. In the illustrated arrangement, the tap $a1$ is connected to potentiometer circuit 210 and serves to determine the temperature peak $a'$ of Fig. 7. The tap $a3$ is connected to potentiometer circuit 212 and serves to determine the temperature peak $c'$. In turn, the taps $a5$, $a7$ and $a9$ are connected to the potentiometer circuits 214, 216 and 218 and serve to determine the temperature peaks, $e'$, $g'$, and $i'$. The intervening taps $a2$, $a4$, $a6$, $a8$ and $a10$ are connected in parallel with each other and to the potentiometer circuit 220, and serve to determine the lower temperatures $b'$, $d'$, $f'$, and $h'$, at which, in Fig. 7, the flow of welding current is re-initiated. With this cross-connection, it will be observed that a total of six potentiometer circuits may be utilized to provide a heating cycle comprising five temperature peaks and comprising four intervening but accurately controlled low temperature points.

As before, the pyrometer leads 64 and 66 are connected to respond to a temperature in the region of the work which affords an accurate measure of the nugget temperature. The arrangement specifically shown in Fig. 8B (as well as in Fig. 5) duplicates the arrangement described in the aforesaid Patent No. 2,372,211, wherein the lead 66 is of constantan. This lead is extended to and into the body of the electrode 14 in such relation that the wire 66 is insulated from the electrode except at the bared end thereof, which bared end is exposed at the work engaging face of the electrode and is forced into electrical connection with such bared end. The other thermocouple lead 64 may be formed of copper having substantially the same composition as the electrode 14, and is directly connected to the electrode.

In this instance, the ratchet unit 84 is also utilized to control the pressure cycle, and to control the termination of the cycle and the resetting of the system. The pressure control is afforded by a series of contacts $b1$ through $b10$, which cooperate with an arm 262. The terminals $b1$ through $b10$ may be connected, in any desired relation, to operate the pressure control relay CR7, through conventional plug and jack elements 270 through 288. To provide the cycle shown in Fig. 7, wherein it is desired to apply the high pressure during each of the successive cooling periods, the control relay CR7 is connected to ratchet terminals $b2$, $b4$, $b6$, $b8$ and $b10$.

To control the termination and resetting of the system, the ratchet unit 84 is provided with an arm 290, which cooperates with a series of terminals $c1$ through $c11$. The associated control relay CR6 may be connected to any or all of the terminals $c1$ through $c10$ through associated plug and jack elements 291 and 292 through 310. As shown, the welding machine is provided with three pilot switches P1, P2 and P3 (top of Fig. 8), which may be selectively operated to give operating cycles of different length. As described below, if pilot switch P1 is operated, the system follows the complete cycle of Fig. 7, since the resetting control relay CR6 is not energized until the control arm 290 engages the final terminal $c11$. If it is desired to provide a cycle having four heats, pilot switch P2 may be operated, in which event relay CR6 terminates the cycle when the arm 290 engages the ratchet terminal $c9$. In Fig. 7, this operation would provide all of the heats except the final heat $i'$. On the other hand, if pilot switch P3 is operated, relay CR6 is operated and terminates the cycle when the ratchet arm 290 engages terminal $c6$, which action eliminates both of the heats $g'$ and $i'$ in Fig. 7.

It is thought that the remaining details of the system of Figs. 8, 8A, etc., may best be understood by a description of the operation thereof. The system may be conditioned for operation by closing the illustrative line switches S2, so as to apply potential to the line conductors 320 and 322, which are common to all of Figs. 8, 8A and 8B. This action, through conventional circuits not shown, may be caused to apply filament potential to the several preferably high vacuum, three-element, sequence control valves CV1, CV2 and CV3. This action further energizes grid transformers T3 and T8 associated, respectively, with the sequence control valves CV1 and CV3, which transformers thereupon become effective to apply negative or blocking potentials to the grids of these valves, and to charge up the corresponding timing condensers 324 and 326. These actions serve only to render the valves CV1 and CV3 non-conductive. In addition, closure of the line switches S2 energizes transformers T11, T12, T13, T14, T16 and T17, associated with the firing valves FV1 and FV2 and with the phase control apparatus therefor. Transformers T11 and T12 serve to supply filament current to the firing valves FV1 and FV2. Transformer T16 is common to and supplies filament current to valves CV4 and CV5. Transformer T13 is common to and, through a potentiometer network comprising resistors 340 and 342, applies energizing current to grid transformers T9 and T10. The effective resistance of this network is determined by the conductivity of the valves CV4 and CV5, which are reversely connected in parallel with resistor 342, and it will be understood that by varying the effective resistance of these valves, which are preferably of the high vacuum type, the point at which transformers T9 and T10 are effective to fire valves FV1 and FV2 may be varied from a point near the beginning of successive half cycles to a point near the close of such successive half cycles. The energization of transformers T14 and T17 applies high negative potentials to the grids of valves CV4 and CV5, giving these valves minimum conductivity, which action delays the firing point of valves FV1 and FV2 until a point late in successive half cycles. This point, as will be understood, may be adjusted by varying the position of the potentiometer tap 344, associated with resistor 340. So long as the line conductors 320 and 322 are energized, accordingly, transformers T9 and T10 apply conducting potentials to firing valves FV1 and FV2 at a selected point in successive half cycles. This action does not serve to fire the main rectifiers V1 and V2, however, since the associated control contacts CR11a and CR11b in the plate circuits of the firing valves FV1 and FV2 are open under the stated conditions.

Finally, the closure of the line switches S2 applies potential to the main rectifiers V1 and V2, which action is without effect, since these rectifiers are now in a non-conductive condition.

In conditioning the system for operation, the switches S3 and S1 may also be closed. The closure of switch S3 serves to prepare the circuits by which the battery 328 supplies power for the operating coils of the ratchet unit 84. The switch S1 when moved to its righthand terminal 330 connects the galvanometer 78 to the pyrometer battery 72 and to the thermocouple leads 64 and 66. As before, preliminary balancing of the pyrometer may be accomplished by first moving the switch S1 to its lefthand terminal 332.

In order to initiate a welding cycle, as specifically shown in the drawing, the pilot switch P1 may be closed, which action completes obvious energizing circuits for control relays CR1 and CR10. Upon being energized, relay CR1 closes its contacts CR1a and CR1b. Contact CR1a completes a self-holding circuit for relay CR1, enabling the pilot switch P1 to be reopened without affecting the cycle. Closure of contact CR1b completes an obvious energizing circuit for the low pressure valve 58, which thereupon functions to cause the electrodes 14 and 16 to engage the work with a normal pressure (curve 202, Fig. 7), lower than the uniform pressure appropriate to the system of Fig. 5.

Closure of contact CR1a also completes an energizing circuit for the plate transformer T1 associated with control valve CV1 and for the corresponding grid transformer T2. Upon being energized, transformer T2, which opposes the originally energized transformer T3, enables the energy stored in condenser 324 to discharge through the associated resistor 340. At the expiration of a short interval determined by the characteristics of this discharge circuit, the grid of valve CV1 assumes a value at which this valve is conductive. This interval, as before, is proportioned to be just sufficiently long to insure that the work is properly clamped before the flow of current is initiated.

Before describing the effect of rendering valve CV1 conductive, it is noted that upon being energized control relay CR10 closes its contact CR10a and opens its contact CR10b. The latter action is without effect since the circuit for the reset coil 96 is now interrupted by the limit switch 224. Closure of contact CR10a, however, completes a circuit, through the now closed series-connected contacts CR5b and CR4b, from the battery 328 to the operating coil 90 of the ratchet unit 84. In response to this action, the winding 90 operates its armature and advances the ratchet unit from the normal or starting position shown to the first operating position, bringing the contact arms 222, 262 and 290 thereof into engagement, respectively, with terminals a, b, and c. This movement of arms 262 and 290 is without effect since the corresponding terminals b1 and c1 are inactive in connection with the sequence for which the apparatus is now adjusted. The movement of arm 222 into engagement with the terminal a—1, however, connects the galvanometer 78 in circuit with the biasing battery 72 and the potential source represented by the thermocouple leads 64 and 66, through the potentiometer 210. As previously described, potentiometer 210 is adjusted so that the galvanometer 78 reaches the illustrated position and operates the relay CR12 when the temperature of the work reaches the peak a' in Fig. 7. Under the conditions stated, however, the thermoelectric potential is of substantially zero value, enabling the battery 72 to predominate, so that the galvanometer element swings to a position in which it is not effective to direct light from the source 74 onto the cell 80.

When valve CV1 becomes conductive, the now energized plate transformer T1 is enabled to pass current therethrough and energizes control relay CR2, which thereupon closes its contacts CR2a and CR2b.

Closure of contact CR2a completes an energizing circuit for transformer T4, which thereupon is enabled to pass current through the normally conductive valve CV2 and energize control relay CR3. Closure of contact CR2b initiates the advance in the firing points of the main rectifiers, as described below.

Upon being energized, relay CR3 closes its contact CR3a, which action immediately energizes the control relay CR11 and also energizes grid transformer T5, associated with valve CV2. The effect of relay CR11 is described below, but it is sufficient to note here that so long as relay CR11 is closed, welding current flows to the welding transformer WT and so long as this relay is deenergized, the flow of welding current is interrupted.

Upon being energized, transformer T5 applies a blocking potential to the grid of valve CV2 and also charges up the associated grid condenser 342. The blocking of valve CV2 interrupts the flow of energizing current to the coil of control relay CR3, enabling the energy stored in the coil thereof to discharge through the associated condenser 344. At the expiration of a discharge period determined by the characteristics of this circuit, relay CR3 resumes the de-energized condition, reopening its contact CR3a. This action de-energizes the grid transformer T5 and also de-energizes control relay CR11, which, as stated generally above, interrupts the flow of welding current. When transformer T5 is de-energized, the energy stored in condenser 342 is enabled to discharge through the associated resistor 346, and at the expiration of a period controlled by the characteristics of this circuit, valve CV2 again becomes conductive, enabling the still energized transformer T4 to re-energize relay CR3. Upon being re-energized, relay CR3 functions, as before, to energize control relay CR11 and to also interrupt its own energizing circuit. So long as transformer T4 is energized, accordingly, control relay CR3 pulsates between the energized and de-energized conditions, causing the welding current to flow in a series of pulsations separated by intervening periods of predetermined length. The flow of this current in a series of pulsations enables the heat to be built up in the weld zone without causing burning of the outer surfaces of the work.

Considering now the circuits in Fig. 8B, by which closure of relay CR11 initiates the flow of current, and by which closure of relay CR2b initiates the gradual increase in the value of the welding current, it will be noted that relay CR11 is provided with two normally open contacts CR11a and CR11b, which are connected in series with the firing valves FV1 and FV2, respectively, between the anodes and igniter electrodes of the associated main rectifiers V1 and V2. It will be recalled that at predetermined points in successive half cycles, the grids of valves FV1 and FV2 are brought to values at which these valves, if supplied with anode potential, are effective to pass current. The adjustment of the system is such that at the time the flow of welding current is initiated, this predetermined point is late in successive half cycles. It may be assumed for purposes of description that firing valve FV1 and its associated rectifier V1 are associated with positive half cycles and that firing valve FV2 and rectifier V2 are associated with negative half cycles. Thus, if the initial energization of control relay CR11 occurs during a positive half cycle, and prior to the predetermined point in such half cycle, firing valve FV1 passes current at such predetermined point, resulting in a firing potential being applied between the cathode and the igniter electrode of the main rectifier V1. This action enables rectifier V1 to pass current and initiate a flow of current to the welding transformer WT. If the initial energization of relay CR11, on the other hand, occurs during a negative half cycle and prior to the predetermined point therein, firing valve FV2 is the first of the firing valves to be rendered conductive and the main rectifier V2 is the first of the main rectifiers to be rendered conductive. In either event, however, a flow of welding current to the welding transformer is initiated at a point in a negative or a positive half cycle which is determined by the setting of the phase control apparatus associated with grid transformers T9 and T10. Also, so long as relay CR11 remains in the energized condition, the thus initiated flow of welding current continues during successive half cycles, being initiated, in each such half cycle, at the point determined by the phase control apparatus.

The closure of relay contact CR2b energizes grid transformers T15 and T18, associated with the phase shift valves CV4 and CV5, enabling these transformers to partially or entirely overcome the biasing effect of the originally energized transformers T14 and T17. This action enables the energy stored in the associated condensers 350 and 352 to start discharging through the corresponding resistors 354 and 356. At a rate determined by the characteristics of these discharge circuits, the potentials of the grids of valves CV4 and CV5 drift in a direction to decrease the resistance to current flow of these valves. As the resistance of valves CV4 and CV5 is decreased, the effective resistance of the network associated with grid transformers T9, T10 and T13 is altered in such a way as to advance the points in successive half cycles at which valves FV1 and FV2 are fired. Thus, in the several cycles making up an initial pulsation of flow of welding current, as determined by the energized condition of relay CR11, rectifiers V1 and V2 may be fired at points in the last fifth of the corresponding half cycle. During the next and in succeeding such pulsations of welding current, however, the firing points of rectifiers V1 and V2 are moved progressively nearer the beginnings of the corresponding half cycles. The rate of this advance is selectively adjustable, and it is preferred to adjust this rate so that during the course of the rise in temperature of the work to the initial peak $a'$ (Fig. 7), the firing points of the rectifiers V1 and V2 reach a point corresponding to the desired maximum heating rate, which point may be the zero point of the current wave of the welding circuit or a later point. In the examples given below, the phase shift range is from approximately 20% full heat to approximately 50% to 60% full heat. As will be understood, the heat setting remains at the above desired maximum value during the balance of the first stage and during subsequent stages.

As will be understood, the pulsating flow of welding current of progressively increasing value, through the electrodes and the work, heats the latter and brings to the fusion temperature the area represented by the nugget 18 in Fig. 1. The progressively increasing temperature of the work is reflected as a correspondingly rising thermoelectric potential between the leads 64 and 66. As this potential rises, the moving element of the galvanometer 78 gradually approaches the position shown in the figure, and when the work reaches the welding temperature, the galvanometer attains the illustrated position, in which light from the source 74 is reflected onto the photocell 80. This action reduces the resistance of this element and enables the associated battery 82 to pass sufficient current through the coil of the relay CR12 to operate this relay. It will be appreciated that, of course, if desired, amplifying apparatus may be interposed between the battery 82 and the relay CR12.

Upon being operated, as aforesaid, relay CR12 closes its contacts CR12a. This action completes obvious energizing circuits for the coil of relay CR5 and for the plate and grid transformers T6 and T7, associated with control valve CV3. Upon being energized, relay CR5 closes it contact CR5a and opens its contact CR5b. The latter action interrupts the previously traced circuit for the operating winding 90 of the ratchet unit, enabling the spring 350, associated therewith, to withdraw the armature 88 to the normal position. This action does not advance the ratchet wheel, but it does condition the armature 88 to effect such an advance.

The energization of transformer T7 overcomes the effect of transformer T8, and enables the energy previously stored in condenser 326 to discharge through the associated resistor 352. At the expiration of a short interval, determined by the characteristics of this discharge circuit, and proportioned to be sufficiently long to permit the ratchet armature 88 to assume the normal or retracted position, valve CV3 becomes conductive. When valve CV3 becomes conductive, the now energized transformer T6 is enabled to pass current therethrough and energize control relay CR4, which thereupon closes its contacts CR4a and opens its contacts CR4b and CR4c. The latter action is without effect, but the former action completes a circuit, through the now closed contact CR5a, for the ratchet coil 90. When re-energized, ratchet coil 90 again advances the ratchet armature 88 and moves the contact arms 222, 262 and 290 to the second of the operative positions thereof.

The opening of contact CR4c interrupts the previously traced circuit for plate transformer T4. If this action occurs during an interval between successive pulsations of the flow of welding current, it has no effect except to prevent the initiation of a further pulsation. If it occurs during the progress of one of such pulsations, it has no effect on the pulsation then in progress, the length of which pulsation is determined, as aforesaid, by the timing condenser 344. In either event, however, the de-energization of transformer T4 prevents the starting of another impulse of welding current and it may be said, therefore, to result in interrupting the further flow of welding current to the work.

The movement of the ratchet unit contact arm 290 into engagement with contact c2 is without effect since this contact is inactive. The movement of contact arm 262 into engagement with contact b2, however, completes an energizing circuit for the high pressure relay CR7, which thereupon closes its contact CR7a and completes an obvious energizing circuit for the high pressure valve 60. During the cooling down of the work, therefore, which follows the interruption of the flow of welding current, the mechanism which responds to valve 60 is effective to maintain a higher or forging pressure between the electrodes. The forging pressure is illustrated by portions 202a, 202b, 202c, 202d, and 202e, of Fig. 7.

The movement of contact arm 222 out of engagement with the ratchet terminal a1 and into engagement with the terminal a2 disconnects the galvanometer from the potentiometer 210 and connects it to the potentiometer 220. As aforesaid, the setting of the potentiometer 220 corresponds to the temperature values represented by the valleys b', d', f' and h' in Fig. 7. Under the conditions stated, the thermoelectric potential, between leads 64 and 66, is considerably in excess of the value which, with the setting of potentiometer 220, would be needed to bring the galvanometer 78 to the operating position. This thermoelectric potential thus tends to swing the galvanometer 78 past this operating position. As illustrated, such a continued movement of the galvanometer is prevented by the limit stop 354. Consequently, throughout the cooling period beginning with the interruption in flow of the welding current and ending when the temperature of the work falls to a value represented by the valley b', the pyrometer relay CR12 remains in the energized position. When this lower temperature is reached, galvanomter 78 swings away from the operating position and consequently de-energizes the pyrometer relay CR12.

Upon being de-energized, relay CR12 reopens its contact CR12a, which action immediately de-energizes relay CR5 and also de-energizes transformers T3 and T7. Upon being de-energized, relay CR5 reopens its contact CR5a and recloses its contact CR5b. The latter action is without effect at this time, but the former action interrupts the circuit for the operating winding 90 of the ratchet unit. In response to the de-energization of winding 90, armature 88 resumes its normal position in readiness for the next ratcheting movement. The de-energization of transformer T7 enables transformer T8 to again block valve CV3, and this action, together with the de-energization of transformer T6, renders control relay CR4 subject to the discharge current of condensers 356. At the expiration of a short period, long enough to enable the just-mentioned return movement of the ratchet armature 88, relay CR4 resumes the de-energized position. This action causes contact CR4a to reopen and causes contact CR4b and CR4c to reclose. Closure of contact CR4c recompletes the circuit for transformer T4, through the still closed contact CR2a, and initiates the flow of welding current leading to the second temperature peak c', in the previously described manner. In this instance, however, since the phase control apparatus has already advanced to its maximum heat position, each pulsation of the welding current is made up of full half cycles of the source.

The reopening of contact CR4a is without effect, but the reclosure of contact CR4b recompletes the circuit for the ratchet winding 90, resulting in the movement of the ratchet unit from the second operating position to the third operating position represented by terminals a3, b3 and c3.

The movement of ratchet arm 290 is still without effect, but the movement of arm 262 out of engagement with terminal b2 interrupts the circuit for the high pressure relay CR7, which thereupon de-energizes the high pressure valve 60 and restores the electrode pressure to the normal value. The movement of arm 262 into engagement with terminal b3 is without effect since this terminal is inactive in the sequence now being described.

The movement of arm 222 out of engagement with terminal a2 disconnects potentiometer 220 and reconnects the galvanometer through potentiometer 212, which latter potentiometer is adjusted to give the temperature peak c'.

When the temperature of the work reaches the value represented by the peak c', the pyrometer again operates relay CR12, which, as before, interrupts the flow of welding current (through relay CR4) and advances the ratchet unit from the third operative position to the fourth operative position, in which the arms 222, 262 and 290 are in engagement, respectively, with terminals $a4$, $b4$ and $c4$. The movement of arm 222 from the third position to the fourth position disconnects the galvanometer from the potentiometer 212 and reconnects it to the low temperature potentiometer 220. The movement of arm 290 is without effect, but the movement of arm 262 again energizes relay CR7, resulting in the application of the high electrode pressure throughout the cooling down of the work from the peak $c'$ to the valley $d'$ of Fig. 7. When this valley is reached, the pyrometer unit again operates to de-energize the pyrometer relay CR12 and initiate the third heat. At this time, also, the ratchet unit is advanced from the fourth to the fifth operative position represented by the terminals $a5$, $b5$ and $c5$, and the electrode pressure is restored to the lower or normal value. In this fifth operative position the pyrometer is connected through potentiometer 214 and cuts off the flow of welding current at the peak $e'$. It is believed to be evident that the actions resulting from the attainment of the temperature $e'$ in Fig. 7 duplicate those described in connection with temperature peaks $a'$ and $c'$ with the exception that the ratchet unit is advanced from the fifth to the sixth operative position. Again, when the lower temperature $f'$ is reached, the flow of welding current is again initiated and the ratchet unit is advanced to the 7th operative position in which the galvanometer is connected through potentiometer 216, which corresponds to the temperature peak $g'$.

When the temperature $g'$ is reached, the flow of welding current is again interrupting, the high electrode pressure is applied, and the pyrometer is reset (through potentiometer 220) to respond to the lower temperature $h'$. During this cooling down period, the ratchet unit occupies its eighth operative position represented by terminals $a8$, $b8$ and $c8$. At the expiration of this cooling period, the flow of welding current is again initiated, the electrode pressure is restored to the initial value and the ratchet unit is advanced to its ninth operative position corresponding to the terminals $a9$, $b9$ and $c9$.

When the final temperature peak $i'$ is attained, the flow of welding current is again interrupted and the ratchet unit is advanced to its tenth operative position represented by terminals $a10$, $b10$ and $c10$. Terminal $a10$ again connects the galvanometer to the low temperature potentiometer 220, which maintains the pyrometer relay CR12 energized until the temperature of the work has fallen away to approximately the point represented at $j$ in Fig. 7. As before, the movement of the arm 290 is without effect, since the corresponding terminal $c10$ is inactive, but the movement of arm 262 again energizes the high pressure relay CR7, resulting in the increase in electrode pressure.

When the temperature of the work has attained the just-mentioned low value represented by the point $j$ in Fig. 7, the pyrometer relay CR12 resumes the de-energized position, which action sequentially de-energizes relays CR4 and CR5, as before, and advances the ratchet unit to the final or eleventh position in which arms 222 and 262 are inactive. In this position, however, arm 290 engages terminal $c11$, which is, as shown, connected through plug and jack 291 to the coil of the resetting relay.

Upon being energized, relay CR6 opens its sole contact CR6a, which action relieves the pressure from the electrodes, and resets the system in readiness for the next welding operation. More particularly, the opening of contact CR6a directly interrupts the circuits for the coils of relays CR1, CR10 and CR11 and for transformers T1 and T2, associated with control valve CV1.

The de-energization of control relay CR1, at contact CR1a, further interrupts the circuits for the coils of relays CR1 and CR10 and for transformers T1 and T2, thereby preventing the reclosure of contact CR6a, described below, from recompleting these circuits. The de-energization of transformers T1 and T2 immediately de-energizes relay CR2, which action, at contact CR2a, interrupts the circuit for transformers T4. For the reasons mentioned below, this circuit is, at the time, already open at contact CR4c, but the opening of contact CR2a prevents recompletion of the circuit for transformer T4. Since transformer T4 is de-energized, it will be understood that relays CR3 and CR11 are also de-energized, so that the opening of the circuit for relay CR11, at contact CR6a, is without effect.

Upon being de-energized by the aforesaid opening of contact CR6a, relay CR10 reopens its contact CR10a and recloses its contact CR10b. This action de-energizes the operating winding 90 of the ratchet unit and energizes the reset winding 96, which thereupon operates to enable the ratchet return spring 92 to restore the ratchet unit to the original position. When the ratchet unit reaches its starting position, it opens the limit switch 224 and de-energizes the reset coil 96. It is noted that during the return movement of the ratchet arm 262, the circuit for the coil of relay CR7 is completed as terminals $b10$, $b8$, $b6$, $b4$ and $b2$ are engaged. The periods of these engagements are, however, so short that relay CR7 does not operate, which relationship may be insured, if desired, by connecting a condenser 360 in parallel with the coil of relay CR7. The return movement of the arm 222 serves to successively reconnect the galvanometer to the several potentiometers in the reverse order, which action is, however, without effect, since at the time in question the temperature is below the temperatures for which all of these potentiometers are set. The return movement of the arm 290 serves only to de-energize relay CR6, which action, as above noted, is without effect since the circuits associated with contact CR6a are now otherwise open.

It is here noted that the de-energization of relay CR4, caused by the opening of pyrometer relay CR12 at the point $j$, also causes contact CR4c to start reclosing, and it will be recalled from previous description that the reclosing of this contact tends to initiate another heating period. Such heating period is prevented from being initiated, however, by the aforesaid opening of contact CR2a. In order to insure the reopening of contact CR2a, prior to the reclosure of contact CR4c, a slight delay may, if desired, be introduced into the reclosing action of contact CR4c. In practice, however, it appears that the energization of relay CR6, which also results from the de-energization of the pyrometer relay CR12, produces the tripping out of relays CR1 and CR2 promptly enough to prevent a false reclosure of the circuit for transformer T4, even though no special provisions be made for delaying the closure of contact CR4c.

The opening of contact CR1b de-energizes valve 58 and relieves the pressure from the electrode, it being recalled that the high pressure valve 60 was de-energized when the ratchet unit moved to its eleventh position. Finally, the opening of contact CR2b de-energizes the compensating transformers T15 and T18, enabling transformers T14 and T17 to restore the phase control valves CV4 and CV5 to a condition of minimum conductivity. This action, as will be understood, conditions the phase control apparatus to pass a minimum welding current through the main rectifiers V1 and V2 at the beginning of the next succeeding welding operation.

It is noted that during the movement of the pyrometer arm 222 between its successive positions in engagement with terminals a1, a2, etc., there is a short period throughout which the galvanometer is disconnected from its sources of potential. During each such short period, the galvanometer may tend to shift out of a position in which it is effective to reflect light onto the photocell 80. To insure that the pyrometer relay CR12 remains energized during such periods, a condenser 362 may be and preferably is connected in parallel therewith.

In certain cases, as aforesaid, it is desirable to accelerate the cooling down of the work and shorten the cooling intervals between successive heats, by subjecting the work, during each such cooling interval, to a water spray, which may be applied at room temperature or, if desired, at a lower temperature. In Fig. 8, a switch S4 is provided, closure of which connects a solenoid operated valve 61 in parallel with the previously mentioned high pressure valve 60. The valve 61 may, as will be understood, serve the purpose, when energized, of causing a spray of water to be directed against the work. With the indicated connection the spray mechanism is effective throughout each cooling period.

Assuming it is desired to effect a weld, utilizing less than the full series of five heats depicted in Fig. 7, one or the other of the pilot switches P2 and P3 may be operated instead of operating the pilot switch P1. With the indicated connections, operation of pilot switch P2 provides a cycle having the heats a', c', e' and g', and operation of pilot switch P3 produces a cycle having only the heats a', c' and e'. More particularly, closure of pilot switch P2 completes an obvious energizing circuit for the coil of control relay CR8, which relay thereupon closes its contact CR8a, through which a circuit is completed for the coils of relays CR1 and CR10. Upon being energized, relay CR1 completes a self-holding circuit through its contact CR1a, which contact also makes a self-holding circuit through contact CR8a for relay CR8. Operation of pilot switch P2 thus energizes and locks in relays CR1 and CR10 in the same manner that these relays are locked in by operation of pilot switch P1 and additionally energizes relay CR8. Relays CR1 and CR10 function, as in the previous example, to initiate a welding cycle, which, unless interrupted, continues through the full five stages depicted in Fig. 7. In this instance, however, relay CR8 functions to interrupt the cycle at the conclusion of the cooling period following the fourth heat g'.

It will be noticed that relay CR8 is provided with an additional normally open contact CR8b which, upon closure, connects the coil of relay CR6 to the ratchet terminal c9. As is described in the previous example, ratchet arm 290 moves to and engages contact c9 when the work reaches the lower temperature h' in Fig. 7. When this point is reached, accordingly, relay CR5 is energized and functions, as in the previous example, to trip out relays CR1, CR10, CR2 and the other relays responsive thereto. The dropping out of the pyrometer relay CR12 at the temperature point h' serves, as in the first example, to deenergize relay CR4, causing the just-mentioned advance of the ratchet arm 290 into engagement with the terminal c9 and also tending to start a fifth heat leading to the temperature peak i'. As in the previous example, however, the energization of relay CR6 trips out relays CR1 and CR2 before contact CR4c recloses, thus preventing the initiation of such fifth heat. As in the first example, also, the tripping operations, which follow the energization of relay CR6, restore the system to its original condition in readiness for a new welding cycle.

It is believed to be evident that if pilot switch P3 is operated, it energizes relay CR1, CR10 and CR9. Of these relays, relays CR1 and CR10 function, as before, to initiate a cycle which, unless interrupted, proceeds through the full five heats of Fig. 7. Relay CR9 is provided with an additional normally open contact CR9b, which, upon closure, connects the tripping out relay CR6 to the ratchet terminal c7. Arm 290 of the ratchet unit moves into engagement with terminal c7 when the low temperature point f' is reached, at which point the control system tends to initiate the fourth heat, but it prevened from doing so by the tripping out action of relay CR6, which functions, as before, to restore the system to normal, enabling a new cycle to be initiated by closure of any of pilot switches P1', P2 and P3.

From the foregoing description, it will be appreciated that the arm 222 of the ratchet unit and its associated terminals serve to determine the succession of temperatures at which heating and cooling stages are initiated and terminated, and that this succession may be selectively varied or controlled by altering the plug and jack connections 250 through 260, and also the individual critical temperatures can be altered by adjusting the several potentiometers 210 through 220. For example, if it is desired that the work be brought to the same temperature in several different heats, the potentiometers corresponding to such heats can be set for identical values or, alternatively, the ratchet terminals corresponding to these heats may all be connected to the same potentiometer, in the manner that terminals a2, a4, etc., are connected to the common potentiometer 220. Also, if it is desired that the temperatures for the several heats differ from each other, and that the temperatures for the different cooling points differ from each other, each terminal of the ratchet unit may be connected to a potentiometer individual to it. Utilizing six potentiometers, this would allow for three heating and three cooling operations.

Similarly, it will be understood that by altering the plug and jack connections associated with relay CR7, the pressure cycle may be varied so as to enable the high pressure to be applied throughout all or any desired part of the full welding cycle. Also, by altering the plug and jack connections, associated with relay CR6, the cycles provided by the individual pilot switches P1, P2 and P3 may be altered.

In Fig. 8B, the legend "Refrigerant" is applied to the electrodes 14 and 16 and while, in the broader aspects of the invention, various methods of electrode cooling, such as conventional water cooling, may be used, a refrigerated cooling medium, such as brine, is preferred for several important reasons. First, the use of a refrigerated cooling medium extracts heat from the weld zone considerably more rapidly than does an unrefrigerated medium. Consequently, the rate of cooling between successive heats is materially increased. This increase in the rate of cooling serves to shorten the over-all length of the welding cycle. A refrigerated cooling medium is also effective to maintain a considerably more even or uniform temperature in the body of the electrodes, during the flow of welding current. As will be understood, the temperature measured by the previously mentioned thermocouple elements is a temperature intermediate the temperature in the body of the electrode, as determined by the coolant, and the temperature of the nugget. Consequently, measures which make the electrode body temperature more uniform materially facilitate the obtaining of thermocouple temperatures which accurately reflect the nugget temperature. The use of a refrigerated cooling medium by maintaining the electrode temperatures at considerably lower values than obtained with usual cooling, materially decreases the mushing or spreading of the electrode faces. This mushing or spreading, of course, shortens the life of the electrodes and, further, by increasing the area of engagement between the electrodes and the work, increases the current requirements of individual welds. The refrigerated cooling medium thus reduces current requirements, increases the electrode life and promotes uniformity of successive welds.

The following schedules A and B specify illustrative operative values which have been found to produce thoroughly satisfactory welded joints between workpieces of the indicated thicknesses and analyses and employing, respectively, cycles of three and five heating stages. In these schedules, temperatures attained in the several heating and cooling stages are given in terms of millivolt settings of the pyrometer apparatus, which pyrometer settings can be arrived at by trial methods. That is to say, in a three-stage cycle, it has been applicants' practice to pass successive samples through a heating stage to arrive at the most satisfactory pyrometer setting for the initial formation of the nugget; to thereafter run a succession of such samples through a heating stage (at the above determined pyrometer setting) and through a grain refining stage, so as to determine the most appropriate pyrometer setting for the grain refining stage; and to finally run a succession of samples through these welding and refining stages and a final refining and/or softening stage to determine the appropriate pyrometer setting for such final stage. It will be appreciated that the successive pyrometer settings, corresponding to the three stages, are not necessarily linearly proportional to the nugget temperatures which, theoretically, might be deemed most appropriate to the three successive stages. This is for the reason that the thermocouple temperatures are not necessarily linearly proportional to the temperatures attained by the nugget in the successive stages. Utilizing apparatus, as described, however, the thermocouple temperatures attained at corresponding stages of successive welds are sufficiently uniform to produce the aforesaid satisfactory results.

Schedule A

Material: Carbon .18% to .23%; manganese .45% to .55%; phosphorus .025%; sulphur .025%; nickel 4.75% to 5%; molybdenum .25% to .35%; vanadium .05% to .15%. Pieces welded: 2 pieces each ½" thick. Nugget size: Approximately ¾" in diameter and ½" thick. Electrodes: Mallory #3, face ¾" in diameter, flat tip. Electrode pressure: Low value 3930 lbs., high value 14,490 lbs. Cooling: Brine at 0° F., circulated at 4 gallons per minute per electrode, brine path extended to within ⅞" of electrode faces. Power: Alternating current 60 cycles. Pulsation rate: 24 cycles on, 6 cycles off. Heat advance: From minimum of 20% of full heat to maximum of 50% to 60% of full heat in approximately 2 seconds. Weld current at maximum heat: 24,000 amperes. Number of stages: 3 heat; 3 cool. Thermocouple: Copper—constantan, per Fig. 8B. Pyrometer: Per Fig. 8A. Pyrometer settings: 1st heat—18 millivolts; 2nd heat—12 millivolts; 3rd heat—6 millivolts; 1st cool—4 millivolts; 2nd cool—4 millivolts; 3rd cool—5 millivolts. Quench: Water at 50° to 60° F.

Schedule B

Same as Schedule A above except as follows: Number of stages: 5 heat; 5 cool. Pyrometer settings: 1st heat—18 millivolts; 2nd heat—14 millivolts; 3rd heat—10 millivolts; 4th heat—8 millivolts; 5th heat—6 millivolts; 1st cool—4 millivolts; 2nd cool—4 millivolts; 3rd cool—4 millivolts; 4th cool—4 millivolts; 5th cool—4 millivolts.

What is claimed is:

1. The method of bonding two or more steel members together which comprises passing a sufficient heating current therethrough while pressing the same together to thereby form a weld nugget; allowing the nugget to cool to a lower temperature below the critical temperature; thereafter again passing a sufficient heating current through said nugget while pressing the members together; effecting a measure of the temperature of said nugget during said flows of current and during the interval between said heating actions; and utilizing means operably responsive to said measure to modify the current when said members reach a welding temperature, to initiate said second heating action when said lower temperature is reached, and to again modify the current when said temperature reaches a value within the austenitic temperature range.

2. The method of bonding two or more steel members together which comprises passing a heating current therethrough while pressing the same together to thereby form a weld nugget, allowing the nugget to cool to a temperature below the critical temperature, thereafter again passing a heating current through said nugget while pressing the members together, measuring the temperature of said nugget during said flows of current and utilizing means operably responsive to said measure for terminating said first flow when said members reach a welding temperature and for terminating said second flow when said temperature reaches a value within the austenitic temperature range.

3. In a welding apparatus, the combination of means for supplying welding current to work to be welded during each of a plurality of successive stages, and thermally responsive means operatively associated with said first-mentioned means for controlling said welding current in each of said stages in accordance with the temperature of the weld zone, and means actuated as a consequence of a first stage for actuating said responsive means to change the magnitude of temperature at which said responsive means is effective to control said current in successive ones of said stages.

4. In a welding apparatus, the combination of means for supplying welding current to work to be welded during each of a plurality of successive stages, thermally responsive means operatively associated with said first-mentioned means for modifying the flow of welding current during each said stage when the temperature of the work reaches a value corresponding to said stage so as to enable the work to cool, and means for adjusting said responsive means to cause it to modify said current flow of successive stages at progressively decreasing temperature whereby said responsive means is operative to progressively decrease the temperature to which the work rises during the successive stages.

5. In a welding apparatus, the combination of means for supplying welding current to work to be welded throughout each of a series of successive stages, said means including means for causing the current to be supplied to said work during each stage as a succession of impulses, thermally responsive means operatively associated with said first-mentioned means for modifying the flow of welding current when the temperature of the work reaches a predetermined point during each stage so as to enable the work to cool, and means operative as a consequence of the initiation of a first said stage, for adjusting the magnitude of the temperature at which the thermally responsive means operates to provide a different value of said temperature for at least another one of said successive stages.

6. In a welding apparatus, the combination of means for supplying welding current to work to be welded throughout each of a series of successive stages, said means including means for causing the current to be supplied to said work during each stage as a succession of impulses, thermally responsive means operatively associated with said first-mentioned means for modifying the flow of welding current when the temperature of the work reaches a predetermined point during each stage so as to enable the work to cool, means responsive to the completion of a preceding stage for reducing the temperature at which the thermally responsive means operates during a successive stage, and means operated at the conclusion of a succeeding stage for resetting said thermally responsive means to an adjustment corresponding to the first stage.

7. In a welding apparatus, the combination of means for supplying welding current to work to be welded during each of a plurality of successive stages, thermally responsive means operatively associated with said first-mentioned means for controlling said welding current in each of said stages in accordance with the temperature of the weld zone, said thermally responsive means being operative to decrease the current flow when in each stage the temperature reaches a predetermined value and to increase the current when the temperature falls to a predetermined value in the interval between stages, and means for regulating one of said predetermined values in accordance with a predetermined pattern in which said regulated predetermined value is decreased in at least one successive stage.

8. In a welding apparatus, the combination of means for supplying welding current to work to be welded during each of a plurality of successive stages, thermally responsive means operatively associated with said first-mentioned means for controlling said welding current in each of said stages, means actuated as a consequence of a preceding stage to provide for a different temperature of the weld zone at a subsequent stage, pressure means for applying pressure to the work during the said stages and in the interval between successive stages, and means operative to alter said pressure so as to provide a higher pressure during said interval than during at least one of said stages.

9. In a welding system, means for subjecting work to be welded to at least two successive heating actions, each said heating action being followed by a cooling period, means controlled by and in accordance with the magnitude of temperature in the region of the weld for controlling the duration of each said heating action, and means actuated as a consequence of the completion of a first of said actions for adjusting the magnitude of said temperature to provide a magnitude different from that of said first action whereby said controlled means will act to control the duration of a subsequent said heating action at a different value of temperature of the weld.

10. In a welding system, means for subjecting work to be welded to a plurality of successive heating actions, each said heating action being followed by a cooling period, means controlled by and in accordance with the magnitude of temperature in the region of the weld for controlling the duration of each said heating action, and means actuated as a consequence of the completion of each said action for adjusting the magnitude of said temperature to provide a magnitude different from that of said completed action whereby said controlled means will act to control the duration of each subsequent said heating action at a different value of temperature of the weld.

11. The combination of claim 10 in which each successive different magnitude is lower than the preceding magnitudes.

CHESTER F. LEATHERS.
LOUIS M. BENKERT.

REFERENCES CITED

The following references are of record in the file of this patent:

UNITED STATES PATENTS

| Number | Name | Date |
|---|---|---|
| 1,252,144 | Murray et al. | Jan. 1, 1918 |
| 1,259,271 | Murray | Mar. 12, 1918 |
| 1,293,867 | Murray | Feb. 11, 1919 |
| 1,933,936 | Schnetzer | Nov. 7, 1933 |
| 1,933,937 | Schnetzer | Nov. 7, 1933 |
| 2,041,343 | Holslag | May 19, 1936 |
| 2,104,749 | Jones | Jan. 11, 1938 |
| 2,162,229 | Remington | June 13, 1939 |
| 2,262,705 | Tuttle | Nov. 11, 1941 |
| 2,269,967 | Whiteley et al. | Jan. 13, 1942 |
| 2,281,335 | Somes | Apr. 28, 1942 |
| 2,299,543 | Humphrey | Oct. 20, 1942 |
| 2,314,691 | Dawson et al. | Mar. 23, 1943 |
| 2,329,977 | Brunberg | Sept. 21, 1943 |
| 2,350,532 | Richardson | June 6, 1944 |
| 2,372,211 | Leathers | Mar. 27, 1945 |

OTHER REFERENCES

"The Making, Shaping and Treating of Steel," Camp and Francis, 5th ed., 1940, Carnegie-Illinois Steel Corp., Pittsburgh, Pa., pages 855, 856, 861 and 862.

Certificate of Correction

Patent No. 2,464,981. March 22, 1949.

CHESTER F. LEATHERS ET AL.

It is hereby certified that errors appear in the printed specification of the above numbered patent requiring correction as follows:

Column 16, line 49, for the word "seat" read *heat*; column 28, line 27, for "it prevened" read *is prevented*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*